US011743586B2

(12) United States Patent
Smyth

(10) Patent No.: US 11,743,586 B2
(45) Date of Patent: Aug. 29, 2023

(54) CAMERA ACTUATOR WITH MOVING COILS AND DYNAMIC FLEX CIRCUIT

(71) Applicant: Apple Inc., Cupertino, CA (US)

(72) Inventor: Nicholas D. Smyth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/373,595

(22) Filed: Jul. 12, 2021

(65) Prior Publication Data

US 2022/0014677 A1 Jan. 13, 2022

Related U.S. Application Data

(60) Provisional application No. 63/076,831, filed on Sep. 10, 2020, provisional application No. 63/051,314, filed on Jul. 13, 2020.

(51) Int. Cl.
*H04N 23/68* (2023.01)
*G02B 27/64* (2006.01)
(Continued)

(52) U.S. Cl.
CPC ......... *H04N 23/687* (2023.01); *G02B 27/646* (2013.01); *G03B 5/00* (2013.01);
(Continued)

(58) Field of Classification Search
CPC ............ H04N 5/23287; H04N 5/2257; H04N 5/23267; H04N 5/2253; H04N 5/2254;
(Continued)

(56) References Cited

U.S. PATENT DOCUMENTS 9,544,482 B2 1/2017 Bang et al.
10,401,590 B2 9/2019 Wan et al.
(Continued)

FOREIGN PATENT DOCUMENTS

CN 201322820 10/2009
KR 20100048361 5/2010
(Continued)

OTHER PUBLICATIONS

International Search Report and Written Opinion from PCT/US20201-041455, dated Oct. 18, 2021, pp. 1-15.
(Continued)

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

Various embodiments include a camera having an actuator with one or more moving coils and a dynamic flex circuit. In some embodiments, the camera may include a movable frame that is fixedly coupled with a lens group or an image sensor. The actuator may be a voice coil motor (VCM) actuator that moves the movable frame relative to one or more stationary structures of the camera. The VCM actuator may include a coil coupled with the movable frame, and a magnet coupled with the stationary structure(s). The dynamic flex circuit may be configured to provide an electrical connection between the coil and the stationary structure(s), and a portion of the dynamic flex circuit may provide service loop to allow motion of the movable frame enabled by the VCM actuator.

20 Claims, 14 Drawing Sheets

(51) Int. Cl.
  *G03B 5/00* (2021.01)
  *H04N 23/57* (2023.01)
(52) U.S. Cl.
  CPC .......... *H04N 23/57* (2023.01); *H04N 23/683* (2023.01); *G03B 2205/0069* (2013.01)
(58) Field of Classification Search
  CPC .......... G02B 27/646; G02B 7/04; G02B 7/09; G03B 5/00; G03B 2205/0069; G03B 30/00; G03B 2205/0007; G03B 5/02; G03B 3/10; H02K 2201/18; H02K 41/0354
  See application file for complete search history.

(56) References Cited

U.S. PATENT DOCUMENTS

| | | | |
|---|---|---|---|
| 10,638,031 B1 | 4/2020 | Brodie et al. | |
| 10,725,313 B2 | 7/2020 | Sugawara | |
| 10,890,734 B1 | 1/2021 | Sharma et al. | |
| 10,924,675 B2 | 2/2021 | Hubert et al. | |
| 11,048,147 B2 | 6/2021 | Sharma | |
| 2011/0103782 A1* | 5/2011 | Tsuruta | G02B 7/022 359/557 |
| 2013/0215284 A1* | 8/2013 | Wade | H04N 5/2328 348/208.7 |
| 2016/0330375 A1 | 11/2016 | Sekimoto | |
| 2017/0108705 A1 | 4/2017 | Yu et al. | |
| 2019/0020822 A1* | 1/2019 | Sharma | H04N 5/23261 |
| 2019/0049692 A1 | 2/2019 | Choi et al. | |
| 2019/0137728 A1 | 5/2019 | Wan et al. | |
| 2019/0141248 A1 | 5/2019 | Hubert et al. | |
| 2020/0050083 A1 | 2/2020 | Jeong et al. | |

FOREIGN PATENT DOCUMENTS

| | | |
|---|---|---|
| KR | 20180064738 | 6/2018 |
| WO | 2016156996 | 10/2016 |

OTHER PUBLICATIONS

U.S. Appl. No. 17/929,295, filed Sep. 1, 2022, Nicholas D. Smyth, et al.

U.S. Appl. No. 17/932,254, filed Sep. 14, 2022, Bin Xu, et al.

\* cited by examiner

CAMERA ACTUATOR WITH MOVING COILS AND DYNAMIC FLEX CIRCUIT

This application claims benefit of priority to U.S. Provisional Application Ser. No. 63/051,314, entitled "Sensor Shift Camera Actuator With Suspension Arrangement," filed Jul. 13, 2020, and claims benefit of priority to U.S. Provisional Application Ser. No. 63/076,831, entitled "Camera Actuator With Moving Coils and Dynamic Flex Circuit," filed Sep. 10, 2020, and which are incorporated herein by reference in their entirety.

BACKGROUND

Technical Field

This disclosure relates generally to architecture for a camera having a sensor shift actuator and/or a suspension arrangement.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 2A shows a top perspective exploded view of the camera. FIG. 2B shows a bottom perspective exploded view of the camera. FIG. 2C shows a top view of the camera. FIG. 2D shows a side cross-sectional view of the camera. FIG. 2E shows a perspective view of a portion of the camera that may include a lens shift actuator used for moving a lens group. FIG. 2F shows an example of folding a flex circuit for coupling with a base structure of the camera.

Figure 1:
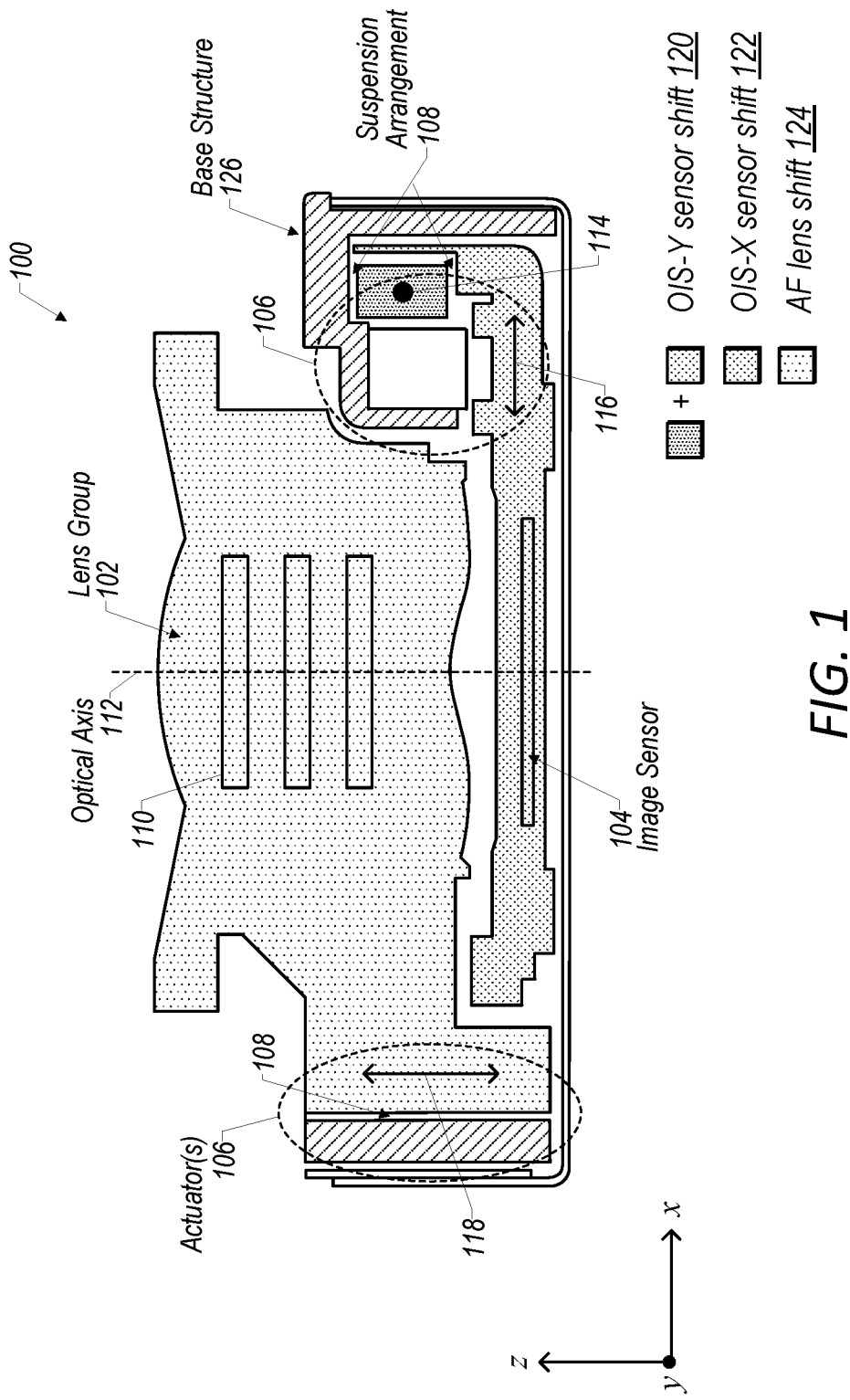
FIG. 1 illustrates a schematic side cross-sectional view of an example camera having a moveable image sensor, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include a camera having a sensor shift actuator and/or a suspension arrangement. In some embodiments, the sensor shift actuator may move the image sensor in multiple directions relative to a lens group of the camera. For example, the actuator may move the image sensor in directions orthogonal to an optical axis of the camera, e.g., to provide optical image stabilization (OIS) functionality. In some embodiments, the camera may include a lens shift actuator for moving the lens group, relative to the image sensor, in a direction parallel to the optical axis, e.g., to provide focus and/or autofocus (AF) functionality. According to some embodiments, one or more suspension arrangements (e.g., bearing suspension arrangement(s), flexure suspension arrangement(s), etc.) may suspend the image sensor and/or the lens group from a base structure of the camera. For example, a respective bearing suspension arrangement may include one or more stages configured to move on ball bearings so as to allow motion enabled by the actuator. In some examples, a flexure suspension arrangement may include a plurality of flexures that suspend the image sensor and allow motion enabled by the actuator.

Additionally, or alternatively, some embodiments include a camera having an actuator with one or more moving coils and a dynamic flex circuit. For example, the camera may include a movable frame that is fixedly coupled with the lens group or the image sensor. The actuator may be a voice coil motor (VCM) actuator that moves the movable frame relative to one or more stationary structures of the camera. The VCM actuator may include a coil coupled with the movable frame, such that the coil moves together with the movable frame. Furthermore, the VCM actuator may include a magnet coupled with the stationary structure(s). The dynamic flex circuit may be configured to provide an electrical connection between the coil and the stationary structure(s). A portion of the dynamic flex circuit may provide sufficient service loop to allow motion of the movable frame enabled by the VCM actuator. The dynamic flex circuit may be configured to convey electrical signals between the stationary structure(s) and the coil via the electrical connection. According to various embodiments, the dynamic flex circuit may include a fixed end portion, a movable end portion, and/or an intermediate portion. The fixed end portion may be fixedly coupled with the stationary structure(s). The movable end portion may be fixedly coupled with the coil. The intermediate portion may extend from the fixed end portion to the movable end portion and may provide the service loop that allows the motion of the movable frame enabled by the VCM actuator.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Described herein are embodiments of a camera having a sensor shift actuator and/or a suspension arrangement. The arrangements discussed throughout generally comprise a camera having a moveable image sensor and/or a moveable lens group, e.g., to provide optical image stabilization (OIS) and/or focus (e.g., autofocus (AF)) during imaging. FIG. 1 shows a generalized example of such a camera 100. The example X-Y-Z coordinate system shown in FIG. 1 may apply to embodiments discussed throughout this disclosure.

In various embodiments, the camera 100 may include a lens group 102, an image sensor 104, one or more actuators 106, and/or one or more suspension arrangements 108. The lens group may include one or more lens elements 110 that define an optical axis 112. The image sensor may capture image data based on light that has passed through the lens group 102. FIG. 1 indicates example, generalized locations at which components of the actuator(s) 106 and the suspension arrangement(s) 108 may be positioned. Actuator(s) and suspension arrangement(s) that may be included in the camera 100 are described in further detail herein with reference to FIGS. 2A-7.

In various embodiments, the actuator(s) 106 may include a sensor shift actuator to move the image sensor 104 (e.g., relative to the lens group 102) and/or a lens shift actuator to move the lens group 102 (e.g., relative to the image sensor 104). In some embodiments, the actuator(s) 106 may comprise one or more OIS actuators configured to move the image sensor in multiple directions orthogonal to the optical axis 112, e.g., to provide OIS movement in a first direction 114 (e.g., the Y-axis direction) and a second direction 116 (e.g., the X-axis direction) orthogonal to the first direction 114. Furthermore, the actuator(s) 106 may comprise one or more focus actuators (e.g., an AF actuator) configured to move the lens group 102 in a direction parallel to the optical axis 112, e.g., to provide focus movement (e.g., AF movement) in a third direction 118 (e.g., the Z-axis direction) that is orthogonal to the first direction 114 and the second direction 116. In some embodiments, the actuator(s) 106 may additionally, or alternatively, be configured to move the image sensor 104 in the third direction 118, and/or to move the lens group 102 in the first direction 114 and/or the second direction 116. In various embodiments, the actuator(s) 106 may comprise one or more voice coil motor (VCM) actuators, e.g., as described herein with reference to FIGS. 2A-4. It should be understood that the actuator(s) 106 may additionally, or alternatively, include one or more other types of actuators (e.g., a piezoelectric actuator, a comb drive actuator, etc.) in some embodiments.

As indicated in FIG. 1, the camera 100 may generally include an OIS-Y sensor shift portion 120, an OIS-X sensor shift portion 122, and/or an AF lens shift portion 124 in some embodiments. In various embodiments, some of the same components of the camera 100 may be included in multiple ones of the OIS-Y sensor shift portion 120, the OIS-X sensor shift portion 122, and the AF lens shift portion 124. For example, the image sensor 104 may be included in the OIS-X sensor shift portion 122 and the OIS-Y sensor shift portion 120 in some embodiments. Furthermore, the OIS-X sensor shift portion 122 may be considered part of the OIS-Y sensor shift portion 120 in some embodiments. The legend in FIG. 1 shows that the OIS-Y sensor shift portion 120 is indicated by two different types of shading (also referred to herein as "first shading" and "second shading"), one of which is also the shading used to indicate the OIS-X sensor shift portion 122. The first shading and the second shading used for the OIS-Y sensor shift portion 120 indicate a portion of the camera 100 that moves together in the first direction 114 (e.g., the Y-axis direction), and the second shading for the OIS-X sensor shift portion 122 indicates a portion of the camera 100 that moves (e.g., independently of the portion shaded with the first shading) in the second direction 116 (e.g., the X-axis direction). The OIS-Y sensor shift portion 120 may be moveable, via the actuator(s) 106, in the first direction 114 to provide OIS-Y movement of an image on the image sensor 104. The OIS-X sensor shift portion 122 may be moveable, via the actuator(s) 106, in the second direction 116 to provide OIS-X movement of the image on the image sensor 104. The AF lens shift portion 124, corresponding to a third shading (that is of a different type than the first shading and the second shading) in the legend in FIG. 1, may be moveable, via the actuator(s) 106, in the third direction 118 to provide focus movement of the image on the image sensor 104.

In various embodiments, the suspension arrangement(s) 108 may comprise one or more bearing suspension arrangements. For example, as discussed herein with reference to FIGS. 2A-2F, one or more OIS bearing suspension arrangements may be configured to suspend the image sensor 104 from a base structure 126 of the camera 100. Additionally, or alternatively, one or more AF bearing suspension arrangements may be configured to suspend the lens group 102 from the base structure 126. In various embodiments, each of the bearing suspension arrangements may include one or multiple stages. For example, in some non-limiting embodiments an OIS bearing suspension arrangement may include multiple stages (e.g., the X stage 208 and the Y stage 210 in FIG. 2), and an AF bearing suspension arrangement may include one stage (e.g., the Z stage 212 in FIG. 2), and each of the stages may be configured to move on ball bearings so as to allow motion enabled by the actuator(s) 106. In some embodiments, each of the stages may comprise a respective moveable structure (e.g., a holder, a frame, and/or a platform, etc.) that is coupled with one or more components of the camera 100 so as to suspend such component(s) from the base structure 126, and the respective moveable structure is moveable (e.g., via the actuator(s)) on ball bearings in at least one direction so as to correspondingly move the component(s) coupled therewith. It should be understood that the suspension arrangement(s) 108 may additionally, or alternatively, comprise one or more other types of suspension arrangements (e.g., a spring, wire, and/or flexure suspension arrangement, etc.) in some embodiments, such as the example flexure suspension arrangement 700 discussed herein with reference to FIG. 7.

Figure 2A:
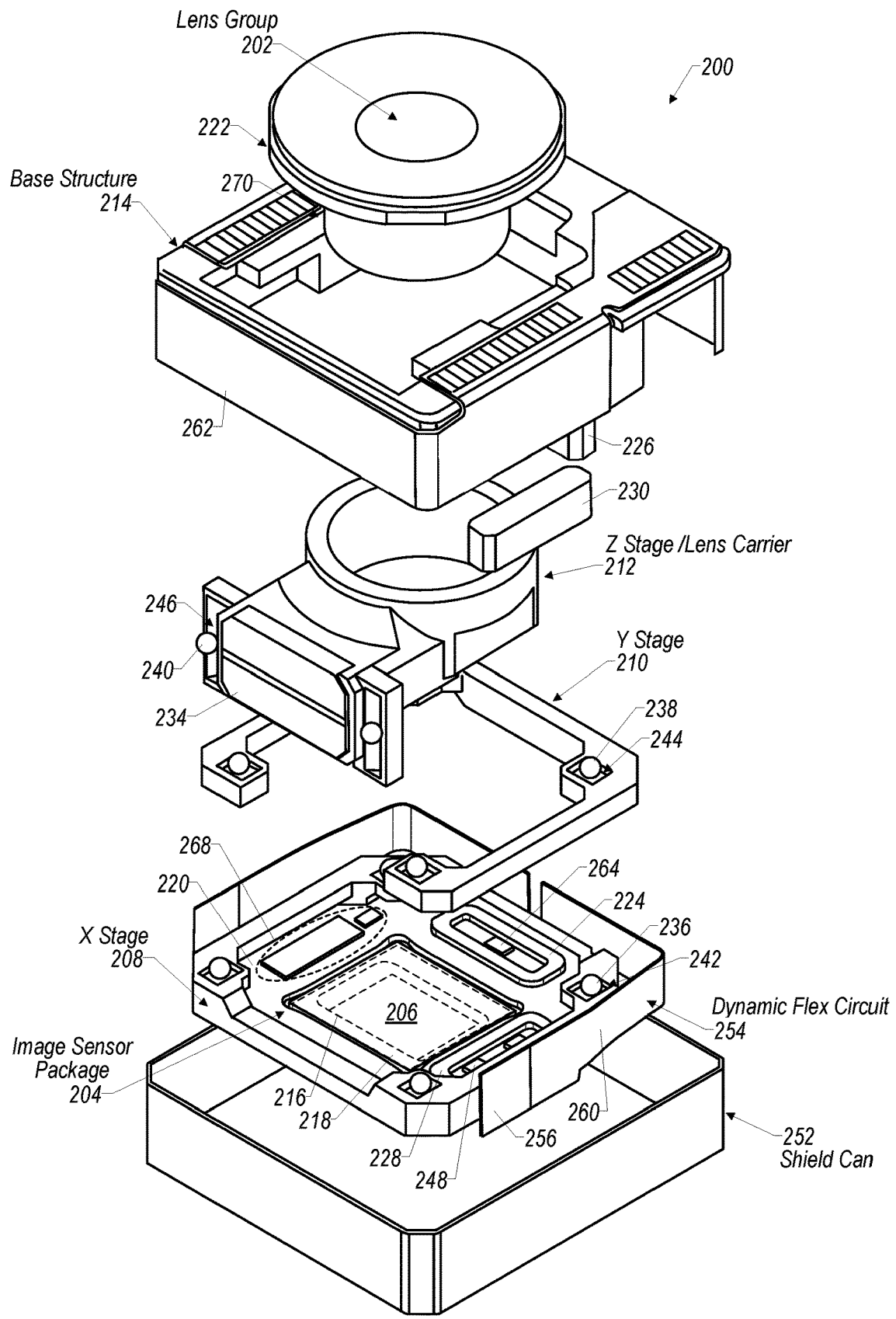
FIGS. 2A-2F illustrate views of an example camera having a sensor shift actuator and one or more bearing suspension arrangements, in accordance with some embodiments.
Figure 2B:
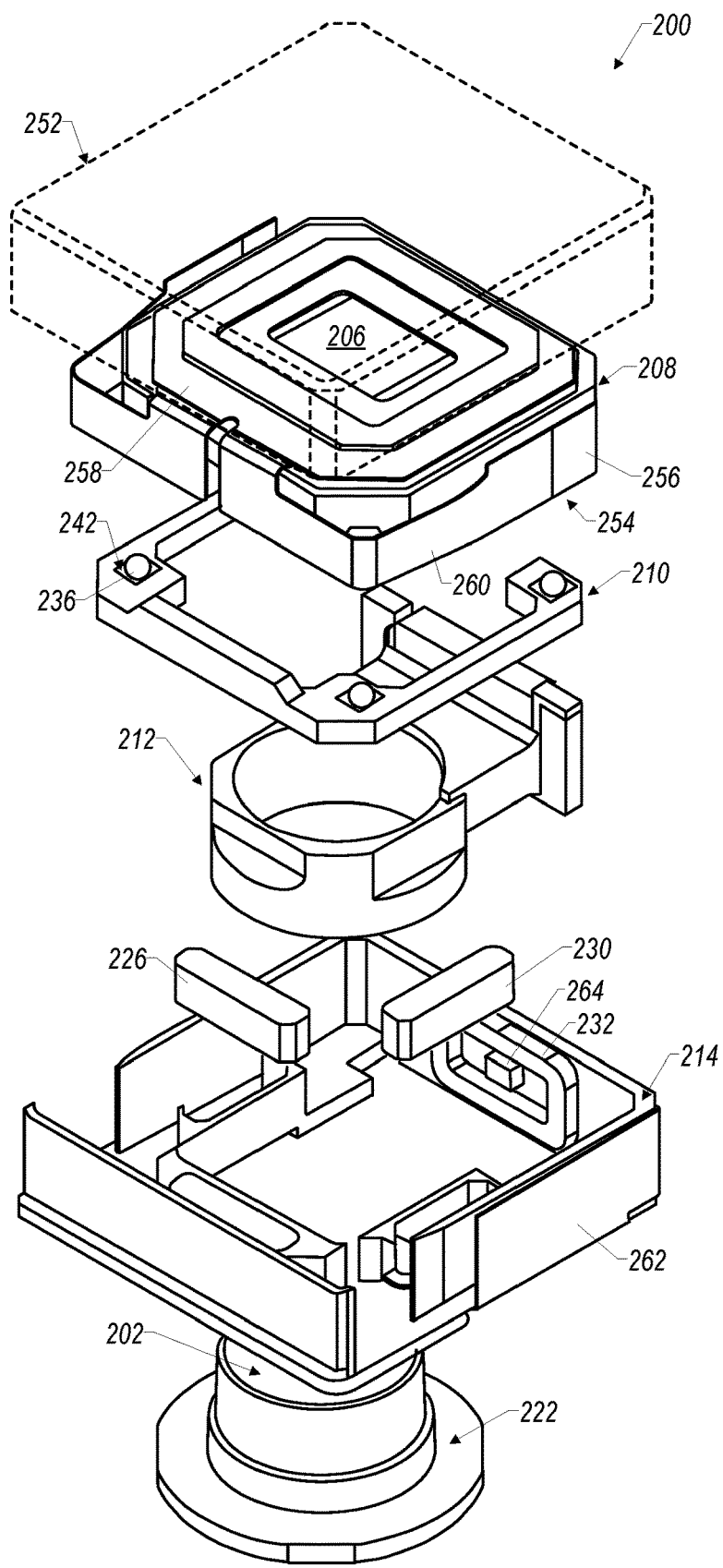
Figure 2C:
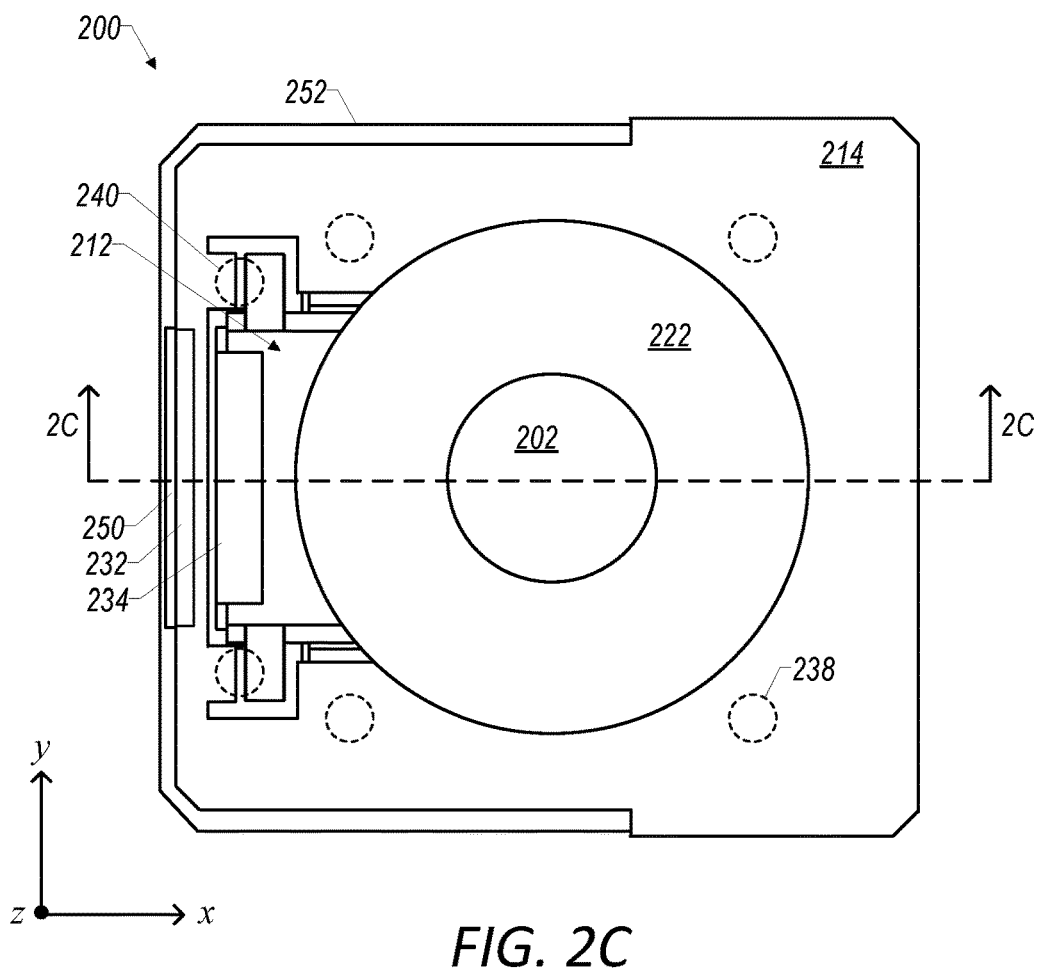
Figure 2D:
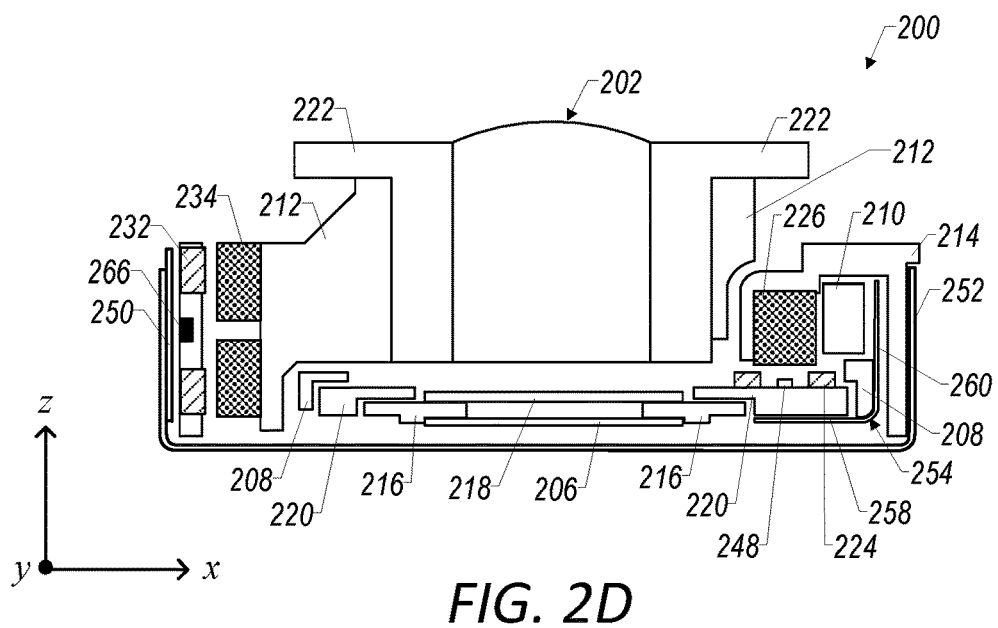
Figure 2E:
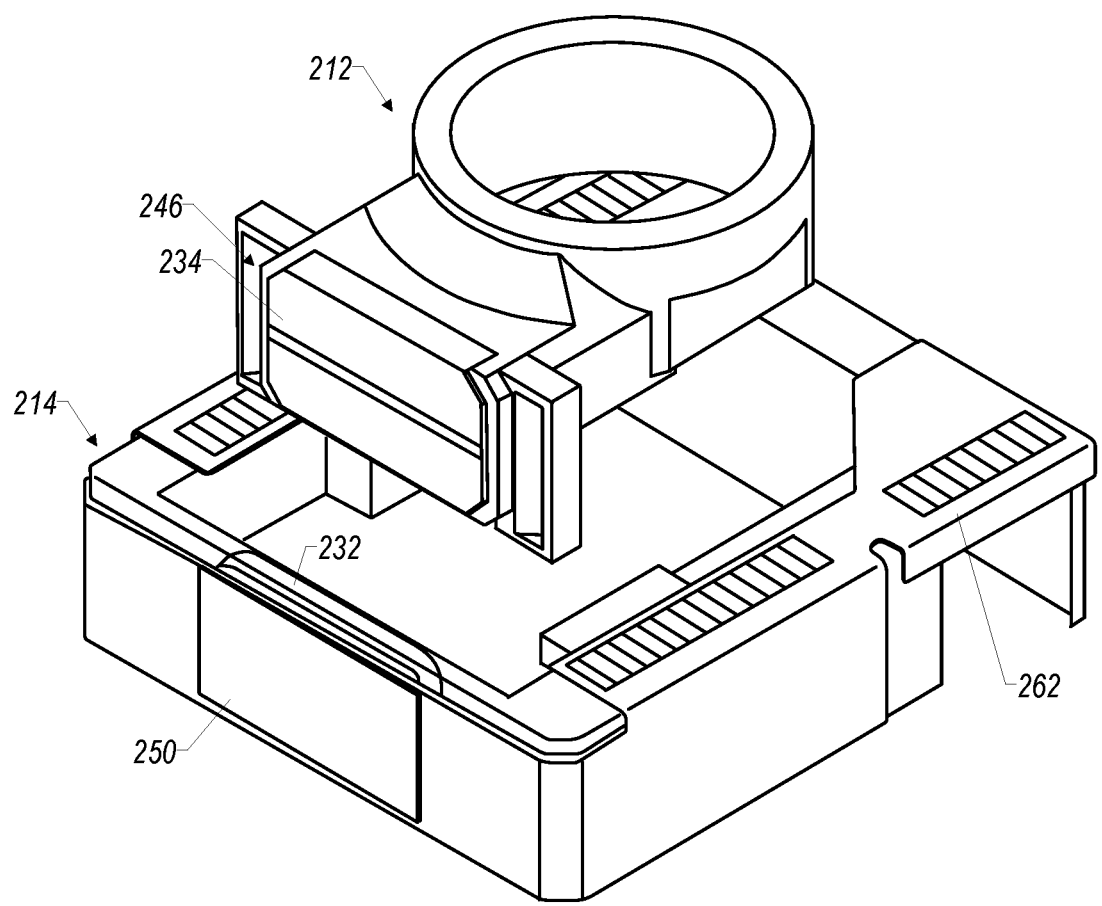
Figure 2F:
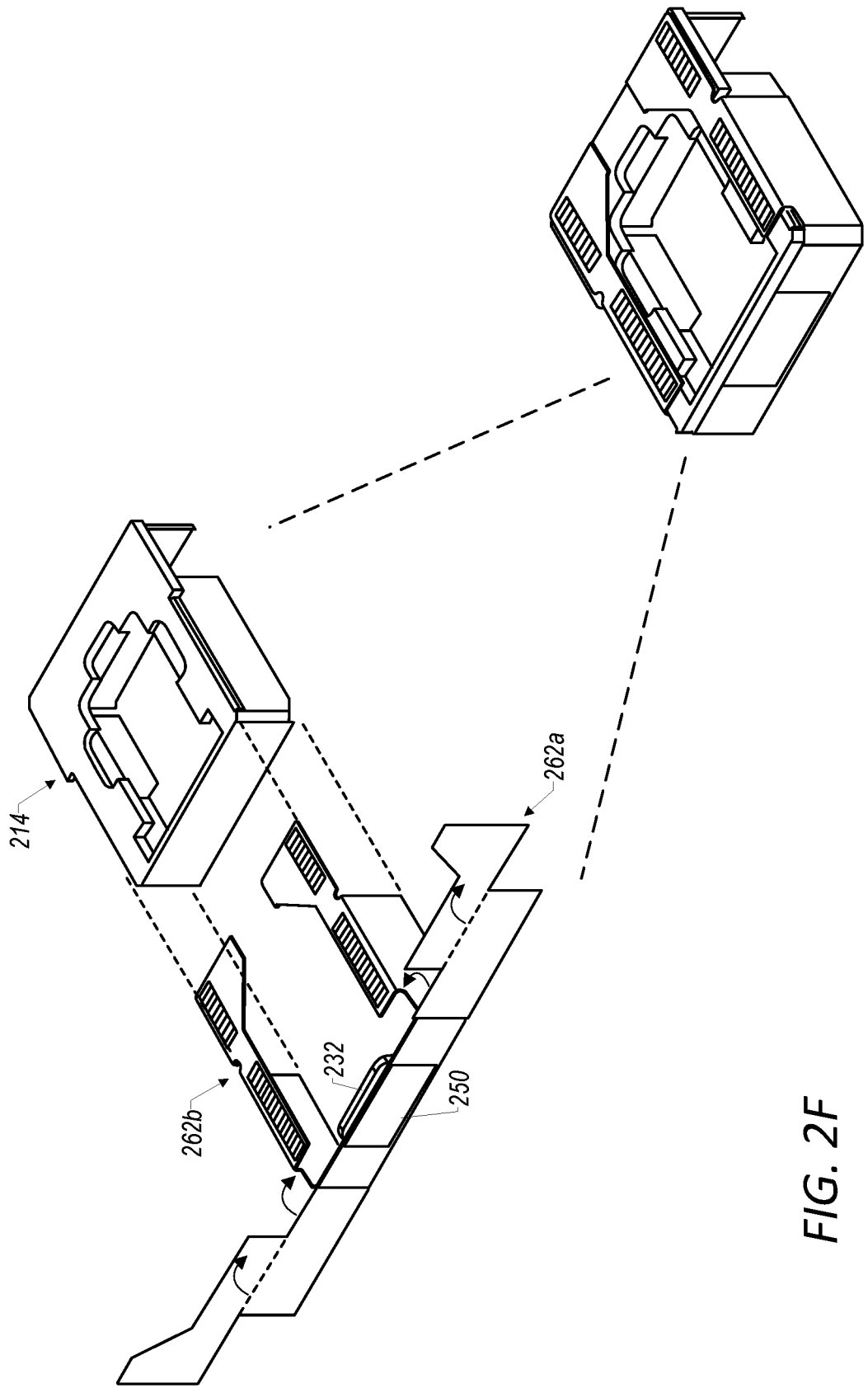

FIGS. 2A-2F illustrate views of an example camera 200 having a sensor shift actuator and one or more bearing suspension arrangements. FIG. 2A shows a top perspective exploded view of the camera 200. FIG. 2B shows a bottom perspective exploded view of the camera 200. FIG. 2C shows a top view of the camera 200. FIG. 2D shows a side cross-sectional view of the camera 200. FIG. 2E shows a perspective view of a portion of the camera 200 that may include a lens shift actuator used for moving a lens group. FIG. 2F shows an example of folding a flex circuit for coupling with a base structure of the camera 200. In some embodiments, the camera 200 may include a lens group 202, an image sensor package 204 (e.g., comprising an image sensor 206), one or more actuators (e.g., comprising the sensor shift actuator and/or the lens shift actuator), one or more bearing suspension arrangements (e.g., comprising an X stage 208, a Y stage 210, and/or a Z stage 212), and/or a base structure 214. According to some embodiments, the camera 200 may be the same as, or similar to, the camera 100 described herein with reference to FIG. 1.

The lens group 202 may include one or more lens elements (e.g., lens element(s) 110 in FIG. 1) that define an optical axis (e.g., optical axis 112 in FIG. 1). The image sensor 206 may be configured to capture image data based on light that passes through the lens group 202. In some embodiments, the image sensor 206 may be attached to a substrate 216. In some embodiments, the image sensor package 204 may include the image sensor 206, the substrate 216, a filter 218 (e.g., an infrared filter), and/or one or more circuit layers (e.g., flex circuit 220). The circuit layer(s) may be used for conveying electrical signals, e.g., between electrical components of the image sensor package 206 (e.g., electrical components mounted to the circuit layer(s)), and/or between the image sensor package 206 and one or more other portions of the camera (e.g., via an electrical interface between the circuit layer(s) and one or more other circuits). In various embodiments, the image sensor package 204 may be coupled with one or more stages of an OIS bearing suspension arrangement. For example, the image sensor package 204 may be fixedly coupled with the X stage 208, such that the image sensor package 204 is moveable together (e.g., in lockstep) with the X stage 208 in the X-axis direction, e.g., via the actuator(s). In some embodiments, the OIS-X sensor shift portion 122 described herein with reference to FIG. 1 may include the image sensor package 204 and the X stage 208. Furthermore, the image sensor package 204 may be coupled with the Y stage 210 via the X stage 208, such that the image sensor package 204 and the X stage 208 are moveable together with the Y stage 210 in the Y-axis direction, e.g., via the actuator(s). In some embodiments, the OIS-Y sensor shift portion 120 described herein with reference to FIG. 1 may include the image sensor package 204, the X stage 208, and the Y stage 210. Additionally, or alternatively, the lens group 202 may be coupled with one or more stages of a focus (and/or an AF) bearing suspension arrangement. For example, the lens group 202 may be fixedly coupled with the Z stage 212, such that the lens group 202 is moveable together (e.g., in lockstep) with the Z stage 212, e.g., via the actuator(s). In some embodiments, the AF lens shift portion 124 described herein with reference to FIG. 1 may include the lens group 202 and the Z stage. The Z stage 212 may comprise a lens carrier in various embodiments. According to some embodiments, the lens group 202 may be at least partially contained within a lens barrel 222, and the lens barrel 222 may be fixedly attached to the Z stage 212.

In various embodiments, the actuator(s) and/or the bearing suspension arrangement(s) may be used for controlled movement of the lens group 202 and/or the image sensor 204. The base structure 214 may be in a fixed position relative to movement of the X stage 208, the Y stage 210, and/or the Z stage 212.

According to various embodiments, the actuator(s) may be used to move the lens group 202 and/or the image sensor 206, e.g., via movement of the X stage 208, the Y stage 210, and/or the Z stage 212. In some embodiments, the actuator(s) may comprise one or more voice coil motor (VCM) actuators. The VCM actuator(s) may include one or more coils (e.g., OIS coil(s) and/or AF coil(s)) that can electromagnetically interact (e.g., when electrical current is provided to the coils) with one or more magnets (e.g., OIS magnet(s) and/or AF magnet(s)) to produce Lorentz forces that move the lens group 202 and/or the image sensor 206, e.g., via controlled movement in directions allowed by the stages of the bearing suspension arrangement.

In some embodiments, the actuator(s) may include an OIS-X VCM actuator (e.g., to provide OIS-X movement), an OIS-Y VCM actuator (e.g., to provide OIS-Y movement), and an AF VCM actuator (e.g., to provide AF movement). For example, the OIS-X VCM actuator may include one or more OIS-X coils 224 and one or more OIS-X magnets 226, e.g., as indicated in FIGS. 2A, 2B, and 2D. In some embodiments, an OIS-X coil 224 may be coupled with the X stage 208. For example, the OIS-X coil 224 may be attached to, and/or embedded in, the flex circuit 220. The flex circuit 220 may be coupled with the X stage 208, e.g., via direct attachment and/or via attachment to one or more other components (e.g., component(s) of the image sensor package 204). An OIS-X magnet 226 may be attached to the base structure 214, e.g., to an underside of the base structure 214. The OIS-X magnet 226 and the OIS-X coil 224 may be positioned proximate one another so that they can electromagnetically interact with each other to shift the image sensor 206 together with the X stage 208 (e.g., relative to the lens group 202 and/or the base structure 214) in the X-axis direction, to provide OIS-X movement of an image on the image sensor 206.

In some embodiments, the OIS-Y VCM actuator may include one or more OIS-Y coils 228 and one or more OIS-Y magnets 230, e.g., as indicated in FIG. 2A. In some embodiments, an OIS-Y coil 228 may be coupled with the X stage 208. For example, the OIS-Y coil 228 may be attached to, and/or embedded in, the flex circuit 220. As previously mentioned, the flex circuit 220 may be coupled with the X stage 208. An OIS-Y magnet 230 may be attached to the base structure 214, e.g., to an underside of the base structure 214. The OIS-Y magnet 230 and the OIS-Y coil 228 may be positioned proximate one another so that they can electromagnetically interact with each other to shift the image sensor 206 together with the X stage 208 and the Y stage 210 (e.g., relative to the lens group 202 and/or the base structure 214) in the Y-axis direction, to provide OIS-Y movement of an image on the image sensor 206.

In some embodiments, the AF VCM actuator may include one or more AF coils 232 and one or more AF magnets 234, e.g., as indicated in FIGS. 2A-2F. In some embodiments, an AF coil 232 may be attached to the base structure 214. An AF magnet 234 may be attached to the Z stage 212. The AF magnet 234 and the AF coil 232 may be positioned proximate one another so that they can electromagnetically interact with each other to shift the lens group 202 together with the Z stage 212 (e.g., relative to the image sensor 206 and/or the base structure 214) in the Z-axis direction, to provide AF movement of an image on the image sensor 206. While some aspects of the actuator(s) may be referred to herein in terms of "AF," it should be understood that such aspects may additionally, or alternatively, be referred to in terms of "focus," in some embodiments.

According to various embodiments, the bearing suspension arrangement(s) may include the X stage 208, the Y stage 210, and/or the Z stage 212. For example, the OIS bearing suspension arrangement may include the X stage 208 and the Y stage 210. As previously discussed, the image sensor 206 may be coupled with the X stage 208 and the Y stage 210 in some embodiments. The AF bearing suspension arrangement may include the Z stage 212, and the lens group 202 may be coupled with the Z stage 212.

Furthermore, the bearing suspension arrangement(s) may include one or more ball bearings (e.g., made of steel, ceramic, etc.). In some embodiments, the OIS bearing suspension arrangement may include one or more X-translation ball bearings 236 and/or one or more Y-translation ball bearings 238. The AF bearing suspension arrangement may include one or more Z-translation ball bearings 240. While some aspects of the suspension arrangement(s) may be referred to herein in terms of "AF," it should be understood that such aspects may additionally, or alternatively, be referred to in terms of "focus," in some embodiments.

In some embodiments, the X stage 208 may be disposed below the Y stage 210 and/or the base structure 214. The X stage 208 may be configured to translate in the X-axis direction, e.g., via X-translation ball bearings 236 disposed between the X stage 208 and an underside of the Y stage 210. According to some examples, the X-axis translation movement may be used to provide OIS-X movement of an image on the image sensor 206. In some embodiments, the X-translation ball bearings 236 may reside within one or more X-translation tracks 242 defined, e.g., by the X stage 208 and/or the Y stage 210. Respective ones of the X-translation track(s) 242 may be oriented in the same direction to allow for constrained movement in a common direction (e.g., the X-axis direction). An underside of the Y stage 210 may be shaped so as to define one or more grooves, recesses, pockets, etc., that at least partially form the X-translation track(s) 242. Additionally, or alternatively, an upper portion of the X stage 208 may be shaped so as to define one or more grooves, recesses, pockets, etc., that at least partially form the X-translation track(s) 242. In some embodiments, the X-translation ball bearings 236 may be disposed within respective spaces of the X-translation track(s) 242 that may be sized to accommodate the X-translation ball bearings 236 between the underside of the Y stage 210 and the upper portion of the X stage 208. In some non-limiting embodiments, the X-translation track(s) 242 may comprise multiple segments. For example, as indicated in FIG. 2A, the X-translation track(s) 242 may comprise four segments positioned at corners of the X stage 208. While the X stage 208 is illustrated in FIGS. 2A, 2B, and 2D as a component with which the image sensor package 204 is coupled, some or all of the aspects described herein regarding the X stage 208 may instead be included in one or more components of the image sensor package 204 in some embodiments. For example, the substrate 216 may itself serve as the X stage 208, instead of the camera 200 including the X stage 208 as a component that is separately formed from the substrate 216.

In some embodiments, the Y stage 210 may be disposed above the X stage 208 and/or below the base structure 214. According to some embodiments, the Y stage 210 may be U-shaped or otherwise shaped to allow for at least a portion of the Z stage 212 to reside in the same plane (e.g., the X-Y plane) as at least a portion of the Y stage 210. The Y stage 210 may be configured to translate in the Y-axis direction, e.g., via Y-translation ball bearings 238 disposed between the Y stage 208 and an underside of the base structure 214. According to some examples, the Y-axis translation movement may be used to provide OIS-Y movement of an image on the image sensor 206. In some embodiments, the Y-translation ball bearings 238 may reside within one or more Y-translation tracks 244 defined, e.g., by the Y stage 210 and/or the base structure 214. Respective ones of the Y-translation track(s) 244 may be oriented in the same direction to allow for constrained movement in a common direction (e.g., the Y-axis direction). An underside of the base structure 214 may be shaped so as to define one or more grooves, recesses, pockets, etc., that at least partially form the Y-translation track(s) 244. Additionally, or alternatively, an upper portion of the Y stage 210 may be shaped so as to define one or more grooves, recesses, pockets, etc., that at least partially form the Y-translation track(s) 244. In some embodiments, the Y-translation ball bearings 238 may be disposed within respective spaces of the Y-translation track(s) 244 that may be sized to accommodate the Y-translation ball bearings 238 between the underside of the base structure 214 and the upper portion of the Y stage 210. In some non-limiting embodiments, the Y-translation track(s) 244 may comprise multiple segments. For example, as indicated in FIG. 2A, the Y-translation track(s) 244 may comprise four segments positioned at corners of the Y stage 210.

In some embodiments, the Z stage 212 may be at least partially encircled by the X stage 208, the Y stage 210, and/or the base structure 214. The Z stage 212 may be configured to translate in the Z-axis direction, e.g., via Z-translation ball bearings 240 disposed between a first portion of the of the Z stage 212 and a side of the base structure 214. According to some examples, the Z-axis translation movement may be used to provide AF movement of an image on the image sensor 206. In some embodiments, the Z-translation ball bearings 240 may reside within one or more Z-translation tracks 246 defined, e.g., by the Z stage 212 and/or the base structure 214. Respective ones of the Z-translation track(s) 246 may be oriented in the same direction to allow for constrained movement in a common direction (e.g., in the Z-axis direction). An inner side of the base structure 214 may be shaped so as to define one or more grooves, recesses, pockets, etc., that at least partially form the Z-translation track(s) 246. Additionally, or alternatively, a side of the first portion of the Z stage 212 may be shaped so as to define one or more grooves, recesses, pockets, etc., that at least partially form the Z-translation track(s) 246. In some embodiments, the Z-translation ball bearings 240 may be disposed within respective spaces of the Z-translation track(s) 246 that may be sized to accommodate the Z-translation ball bearings 240 between the side of the base structure 214 and the side of the first portion of the Z stage 212. In some non-limiting embodiments, the Z-translation track(s) 246 may comprise multiple segments. For example, as indicated in FIG. 2A, the Z-translation track(s) 246 may comprise two segments positioned at opposite sides of the first portion of the Z stage 212, relative to the AF magnet 234 (which may be attached to the same side of the Z stage 212 as the Z-translation ball bearings 240 and the Z-translation track(s) 246).

According to some embodiments, the lens group 202 may be fixedly coupled with a second portion of the Z stage 212. In some examples, the second portion of the Z stage 212 may at least partially encircle the lens group 202 (and/or the lens barrel 222). According to some embodiments, the Z stage 212 may extend, in a direction orthogonal to the optical axis (e.g., in the X-axis direction), from the first portion (which may be located proximate the side of the base structure 214) to the second portion (which may be located proximate the lens group 202), e.g., as a cantilever. In various embodiments, the Z stage 212 may suspend the lens group 202 above the image sensor 206, e.g., such that the image sensor 206 and the lens group 202 are positioned along the optical axis.

In various embodiments, the camera 200 and/or the bearing suspension arrangement(s) may include one or more ferritic components (e.g., formed of iron, stainless steel, etc.) that magnetically interact with one or more magnets to preload the ball bearings of the bearing suspension arrangement(s), e.g., in a load direction that is based at least in part on forces of attraction between the magnet(s) and the ferritic component(s).

In some embodiments, ferritic component(s) 248 may be positioned below the OIS-Y magnet 230 to preload the X-translation ball bearings 236 and/or the Y-translation ball bearings 238 with a load in the Z-axis direction. For example, as indicated in FIGS. 2A and 2D, the ferritic component(s) 248 may be encircled by the OIS-Y coil 228 and/or coupled with the flex circuit 220. FIG. 2A shows two ferritic component(s) 248 within an inner periphery of the OIS-Y coil 228; however, the camera 200 and/or the OIS bearing suspension arrangement may include fewer or more ferritic component(s) 248 for preloading the X-translation ball bearings 236 and/or the Y-translation ball bearings 238 in various embodiments. Additionally, or alternatively, one or more other magnets (not shown) may be included to magnetically interact with the ferritic component(s) 248, to preload the X-translation ball bearings 236 and/or the Y-translation ball bearings 238 in some embodiments.

In some embodiments, ferritic component(s) 250 may be positioned proximate the AF magnet 234 to preload the Z-translation ball bearings 240 with a load in a direction orthogonal to the Z-axis direction (e.g., in the X-axis direction). For example, as indicated in FIGS. 2C-2F, the ferritic component(s) 250 may be disposed between the AF magnet 234 and a side of the camera 200. FIGS. 2C-2F show one ferritic component 250 for preloading the Z-translation ball bearings 240; however, the camera 200 and/or the AF bearing suspension arrangement may include one or more ferritic components 250 for preloading the Z-translation ball bearings 240 in various embodiments. Additionally, or alternatively, one or more other magnets (not shown) may be included to magnetically interact with the ferritic component(s) 250, to preload the Z-translation ball bearings 240 in some embodiments.

In various embodiments, the camera 200 may include a flex circuit 254 (also referred to herein as "dynamic flex circuit") that may be coupled with the image sensor package 204. For example, the dynamic flex circuit 254 may include one or more fixed end portions 256 (FIGS. 2A and 2B), a moveable end portion 258 (FIGS. 2B and 2D), and/or an intermediate portion 260 (FIGS. 2A, 2B, and 2D). The fixed end portion(s) 256 may be connected to a stationary structure, such as, but not limited to, the base structure 214 and/or an additional flex circuit 262 (e.g., a stationary flex circuit) that is attached to the base structure 214, e.g., as indicated in FIGS. 2A, 2B, 2E, and 2F. The moveable end portion 258 may be coupled with the image sensor package 204 such that the moveable end portion 258 moves together with (e.g., in lockstep with) the image sensor 206. In some embodiments, the moveable end portion 258 may be attached to an underside of the image sensor package 204. For example, in some embodiments the moveable end portion 258 may be attached to a bottom surface of the flex circuit 220 of the image sensor package 204, as indicated in FIGS. 2B and 2D. The intermediate portion 260 may extend from the fixed end portion(s) 256 to the moveable end portion 258. The intermediate portion 260 may be configured to allow the moveable end portion 258 to move (e.g., with the image sensor 206) relative to the fixed end portion(s) 256. In some embodiments, the camera 200 may be configured to convey electrical signals (e.g., power and/or control signals) between the stationary structure (e.g. the flex circuit 262) and the image sensor package 204 via the dynamic flex circuit 254. Additionally, or alternatively, the dynamic flex circuit 254 may be configured to convey electrical signals (e.g., power and/or control signals) along at least a portion of an electrical connection path between the stationary flex circuit 262 (which may be attached to the base structure 214) and the image sensor 206. FIG. 2F shows an example of folding the flex circuit 262 for coupling with the base structure 214. In some embodiments, the flex circuit 262a may be in a flat state, then folded as indicated by the arrows and fold lines in FIG. 2F to a folded state (flex circuit 262b) that wraps around a portion of the base structure 214.

According to various embodiments, one or more portions of the dynamic flex circuit 254 may extend along (and/or proximate to) one or more respective sides of the camera 200, e.g., for efficient use of space that may enable a reduction in size of the camera 200 in its X dimension(s) and/or Y dimension(s). For example, the moveable end portion 258 may extend along a lower side of the camera 200, and the dynamic flex circuit 254 may include straight regions and one or more bend regions such that the intermediate portion 260 and the fixed end portion(s) 256 comprise one or more folded legs that extend proximate sides of the camera 200 that are parallel to the optical axis, e.g., as indicated in FIGS. 2A, 2B, and 2D. Additional aspects of a dynamic flex circuit and/or other flex circuits that may be included in the camera 200 are described herein with reference to FIG. 3.

In some embodiments, the camera 200 may include one or more position sensors (e.g., magnetic field sensors, such as Hall sensors, tunneling magnetoresistance (TMR) sensors, giant magnetoresistance (GMR) sensors, etc.) for position sensing with respect to OIS-X movement, OIS-Y movement, and/or AF movement. For example, the camera 200 may include position sensor 264 for position sensing with respect to OIS-X movement and/or OIS-Y movement. In some embodiments, the position sensor 264 may be positioned proximate the OIS-X coil 224, e.g., so as to be capable of detecting changes in the magnetic field forces of the OIS-X magnet 226 as the OIS-X coil 224 moves in the X-axis direction and/or the Y-axis direction. In a non-limiting example, the position sensor 264 may be coupled with the flex circuit 220 and/or may be at least partially encircled by an inner periphery of the OIS-X coil 224. Furthermore, the camera 200 may include position sensor 266 for position sensing with respect to AF movement. In some embodiments, the position sensor 264 may be positioned proximate the AF coil 232, e.g., so as to be capable of detecting changes in the magnetic field forces of the AF magnet 234 as the AF magnet 234 moves in the Z-axis direction. In a non-limiting example, the position sensor 266 may be coupled with the base structure 214 (e.g., attached to the stationary flex circuit 262) and/or may be at least partially encircled by an inner periphery of AF coil 232.

In various embodiments, the camera 200 may include one or more other electrical components 268 coupled to the image sensor package 206. For example, the electrical component(s) 268 may include one or more driver integrated circuits (e.g., comprising a driver integrated circuit used for driving coil(s) of the actuator(s)) and/or one or more position sensors, etc., mounted to or otherwise coupled with the flex circuit 220 of the image sensor package 206. In some non-limiting embodiments, the electrical component(s) 266 may include a position sensor (e.g., for position sensing with respect to OIS-X movement and/or OIS-Y movement) that may be oriented differently than position sensor 264. In some embodiments, such a position sensor may be configured to detect changes in the magnetic field forces of a probe magnet and/or another drive magnet of the actuator(s), which may be attached to the base structure 214 (e.g., at the position indicated by arrow 270 in FIG. 2A) in some embodiments.

Figure 3:
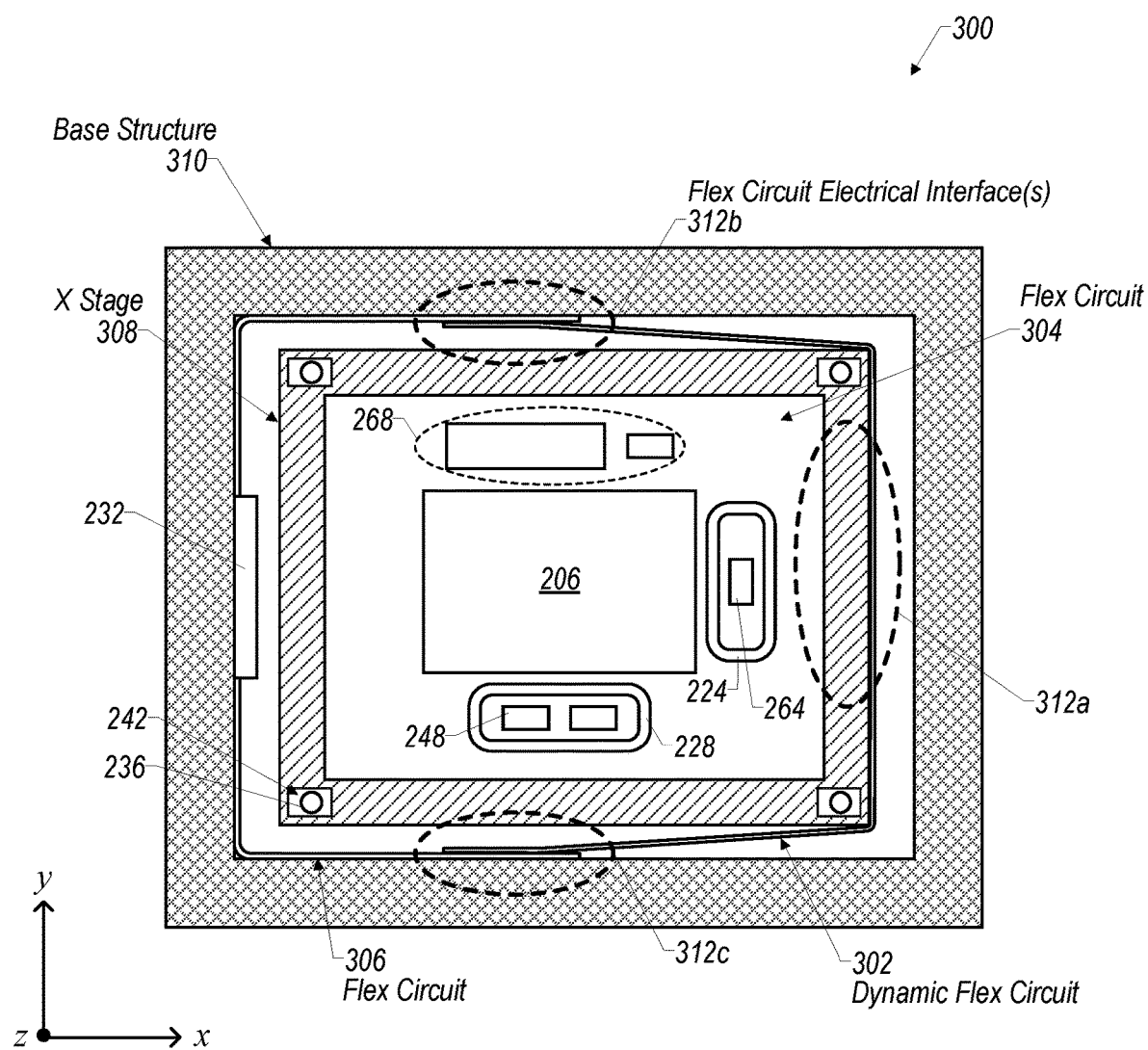
FIG. 3 shows a schematic representation of an example flex circuit arrangement that may be used to convey electrical signals to, from, and/or within a camera configured with a sensor shift actuator, in accordance with some embodiments.

FIG. 3 shows a schematic representation of an example flex circuit arrangement 300 that may be used to convey electrical signals in a camera (e.g., camera 100 in FIG. 1 and/or camera 200 in FIGS. 2A-2F) configured with a sensor shift actuator. The flex circuit arrangement 300 may include a dynamic flex circuit 302, which may be the same as, or similar to, the dynamic flex circuit 254 described herein with reference to FIGS. 2A and 2C. Furthermore, the flex circuit arrangement 300 may include one or more circuit layers (e.g., flex circuit 304, which may be the same as, or similar to, the flex circuit 220 of the image sensor package 204 in FIGS. 2A and 2D) and/or a stationary flex circuit 306 (which may be the same as, or similar to, the stationary flex circuit 262 described herein with reference to FIGS. 2A-2F). In various embodiments, the flex circuit arrangement 300 may be configured to convey electrical signals between a stage (e.g., X stage 308) of a bearing suspension arrangement and a base structure 310 of the camera.

In some embodiments, the stationary flex circuit 306 may be attached to the base structure 310 and/or the AF coil 232. Furthermore, the stationary flex circuit 306 may extend along, or proximate to, one or more sides of the base structure 310. For example, as indicated in FIG. 3, the stationary flex circuit 306 may include straight regions and one or more bend regions. In some embodiments, the stationary flex circuit 306 may extend, in directions orthogonal to an optical axis (e.g., optical axis 112 in FIG. 1), along inner and/or outer sides of the base structure 310.

In some embodiments, the flex circuit arrangement 300 may include flex circuit electrical interface(s) 312 at which the dynamic flex circuit 302 may be coupled with the flex circuit 304 or the stationary flex circuit 306, e.g., such that the dynamic flex circuit 302 may be used to convey electrical signals from the flex circuit 304 (and/or one or more other components of the image sensor package and/or the X stage 308) to the stationary flex circuit 306, and/or vice-versa. For example, a flex circuit electrical interface 312a may comprise one or more electrical connections between the moveable portion of the dynamic flex circuit 302 and the flex circuit 304 and/or the image sensor package. Furthermore, a second flex circuit electrical interface 312b and/or a third flex circuit electrical interface 312c may comprise electrical connection(s) between respective fixed end portions of the dynamic flex circuit 302 and the stationary flex circuit 306.

In some non-limiting examples, power from a driver integrated circuit (which may be mounted to the flex circuit 304) may be conveyed to the AF coil 232 via the flex circuit arrangement 300. For example, drive current may be conveyed from the flex circuit 304 to the dynamic flex circuit 302 via the first flex circuit electrical interface 312a, then from the dynamic flex circuit 302 to the stationary flex circuit 306 via the second flex circuit electrical interface 312b and/or the third flex circuit electrical interface 312c, and then from the stationary flex circuit 306 to the AF coil 232 so as to drive the AF coil 232.

Figure 10:
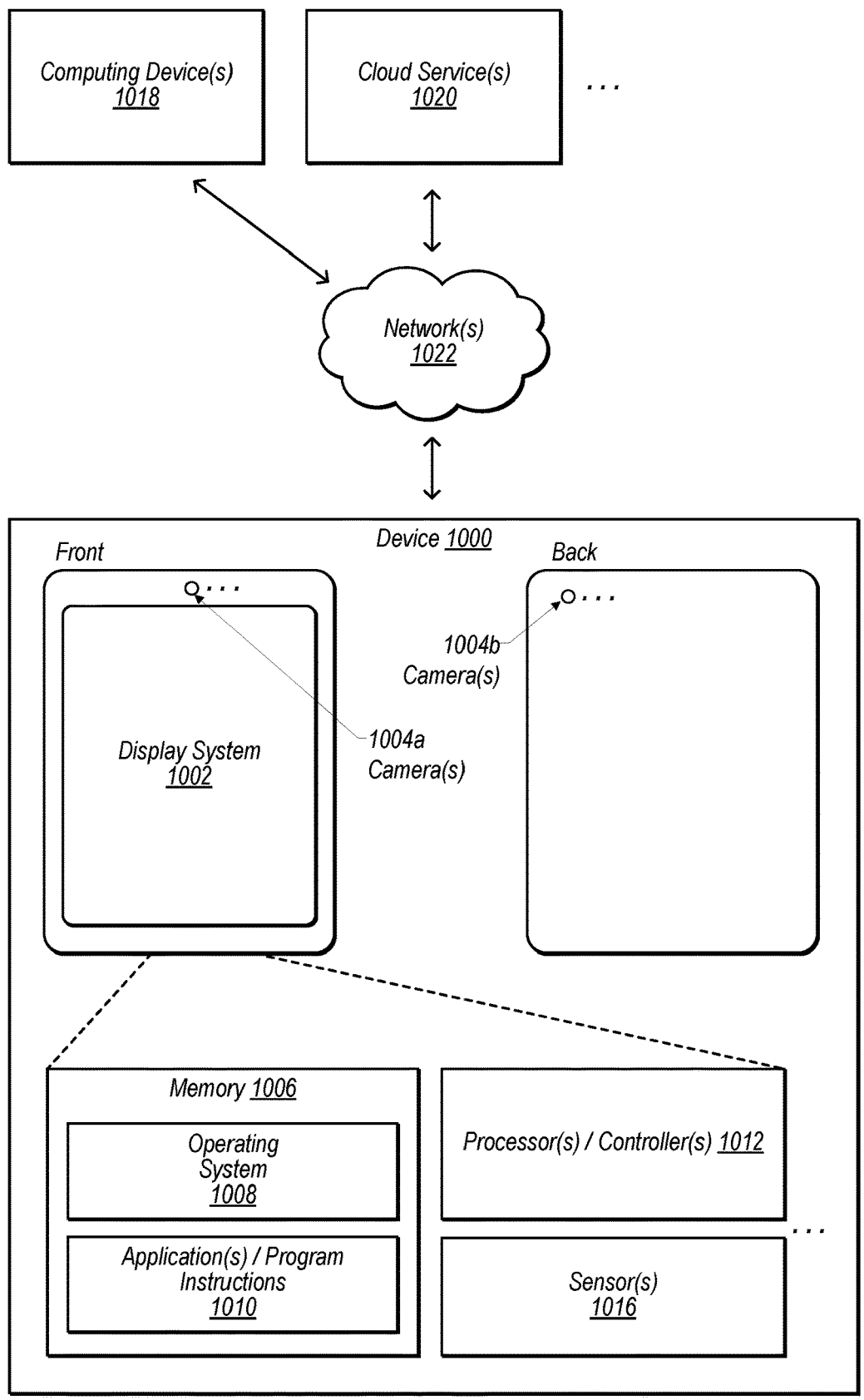
FIG. 10 illustrates a schematic representation of an example device that may include a camera having a sensor shift actuator and/or a suspension arrangement, in accordance with some embodiments.
Figure 11:
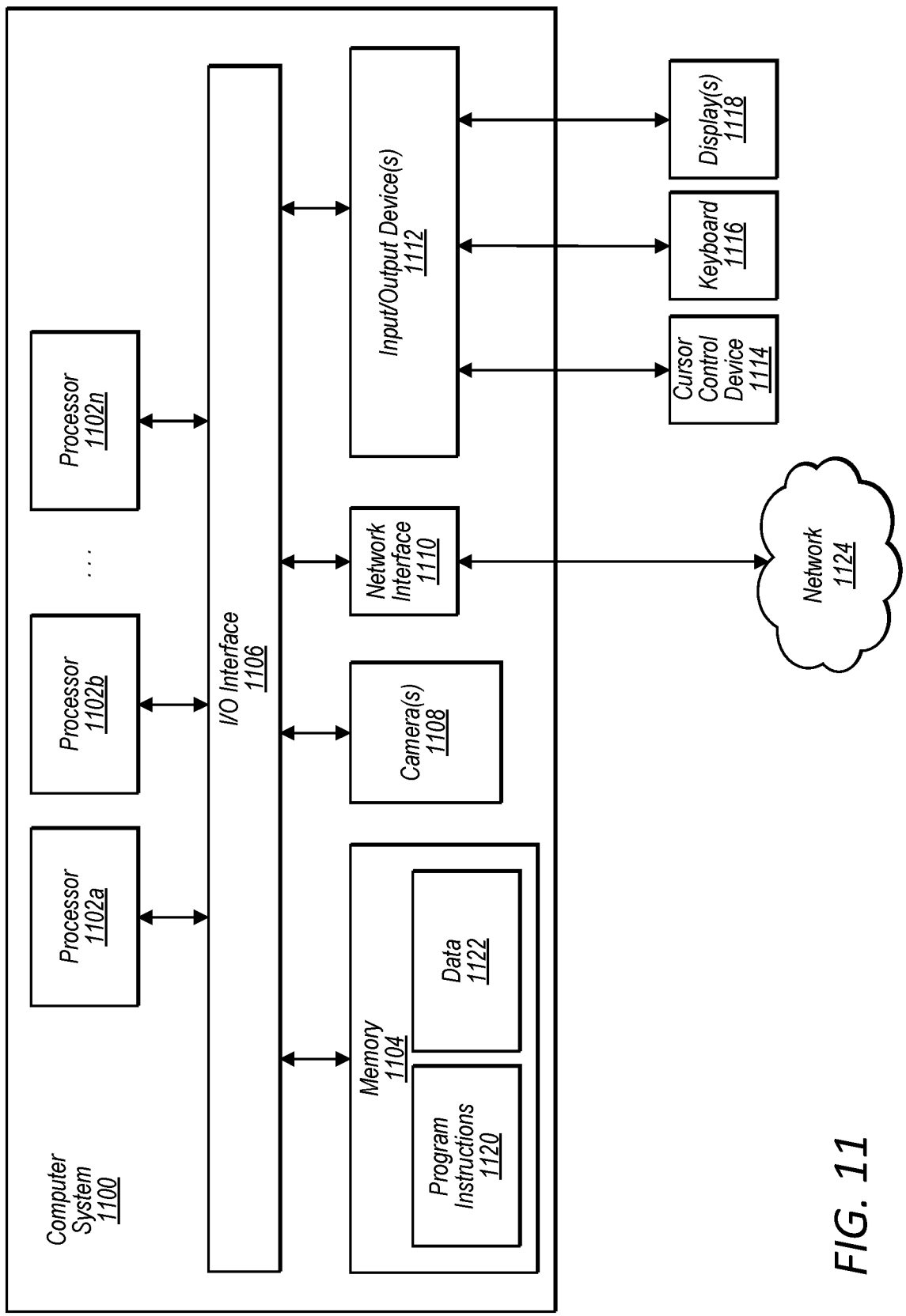
FIG. 11 illustrates a schematic block diagram of an example computer system that may include a camera having a sensor shift actuator and/or a suspension arrangement, in accordance with some embodiments.

In some non-limiting examples, a portion of the stationary flex circuit 306 (and/or one or more other portions of the flex circuit arrangement 300) may exit the camera module, such that the flex circuit arrangement is configured to convey certain signals (e.g., signals associated with image data captured via the image sensor 206, signals associated with position sensor data captured via the position sensor(s) 264 and 266 in FIGS. 2A and 2D, etc.) between the camera module and one or more components that are external to the camera, such as an image signal processor (ISP) of a device (e.g., the device 1000 in FIG. 10, the computer system 1100 in FIG. 11, etc.). The flex circuit arrangement 300 may be used to convey signals from the image sensor 206 via a substrate (e.g., substrate 216 in FIGS. 2A and 2C) coupled with the image sensor 206 and the flex circuit 304. Additionally, or alternatively, the flex circuit arrangement 300 may be used to convey control signals (e.g., signals associated with actuator commands from controller(s) of the ISP) to the driver integrated circuit for driving the coil(s) of the actuator(s).

Figure 4:
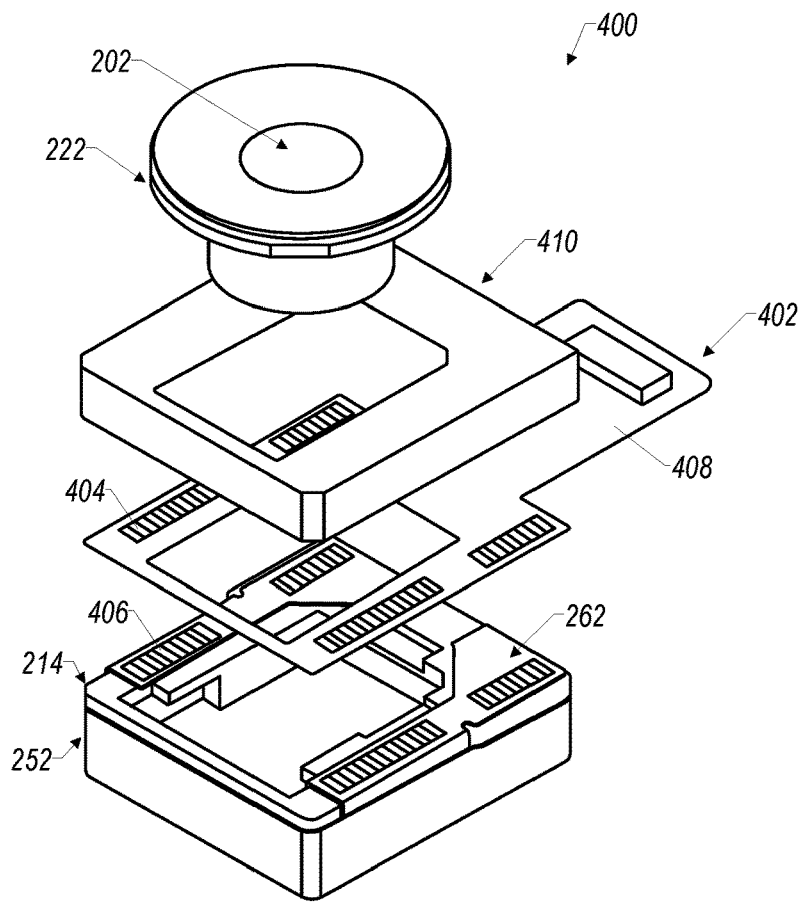
FIG. 4 illustrates a top perspective exploded view of an example flex circuit arrangement that may be used to convey electrical signals to, from, and/or within a camera configured with a sensor shift actuator, in accordance with some embodiments.

FIG. 4 shows a top perspective exploded view of an example flex circuit arrangement 400 that may be used to convey electrical signals to, from, and/or within a camera (e.g., camera 100 in FIG. 1 and/or camera 200 in FIGS. 2A-2D) configured with a sensor shift actuator. The flex circuit arrangement 400 may include a flex circuit 402 that may electrically interface with the stationary flex circuit 262 that is attached to the base structure 214. For example, as indicated in FIG. 4, the flex circuit 402 may comprise exposed ACF pads 404 that may be attached (e.g., via ACF bonding, reflow soldering, and/or ultrasonic bonding, etc.) with corresponding exposed ACF pads 406 of the stationary flex circuit 262.

In some embodiments, the stationary flex circuit 262 may also be coupled with a dynamic flex circuit (e.g., dynamic flex circuit 254 in FIGS. 2A, 2B, and 2D, dynamic flex circuit 302 in FIG. 3, etc.) and/or one or more circuit layers (e.g., flex circuit 220 in FIGS. 2A and 2D, flex circuit 304 in FIG. 3, etc.). As previously discussed, such a configuration may enable conveying electrical signals between an image sensor package (and/or an image sensor) and the stationary flex circuit 262, via the dynamic flex circuit and/or the one or more circuit layers.

According to various embodiments, the flex circuit 402 may convey electrical signals between the stationary flex circuit 262 and one or more components that are external to the camera, such as an image signal processor (ISP) of a device (e.g., the device 1000 in FIG. 10, the computer system 1100 in FIG. 11, etc.). As indicated in FIG. 4, a portion 408 of the flex circuit 402 may exit the camera module and extend away from the camera module so that the flex circuit 402 is configured to convey electrical signals between the camera module and the component(s) that are external to the camera. In some embodiments, a stiffener 410 may be mounted on a portion of the flex circuit 402, e.g., to provide structural support to the flex circuit arrangement 400 and/or to the camera. The stiffener 410 may encase a portion of the camera. For example, the stiffener 410 may have an upper wall that covers an upper portion of the camera, and side walls that cover side portions of the camera. In some embodiments, the stiffener 410 may not include a side wall at the side of the camera through which the portion 408 of the flex circuit 402 exits the camera module. In some embodiments, the stiffener 410 may have a side wall at the side of the camera through which the portion 408 of the flex circuit 402 exits the camera module, but that side wall may be configured to allow the portion 408 of the flex circuit 402 to exit the camera module.

Figure 5:
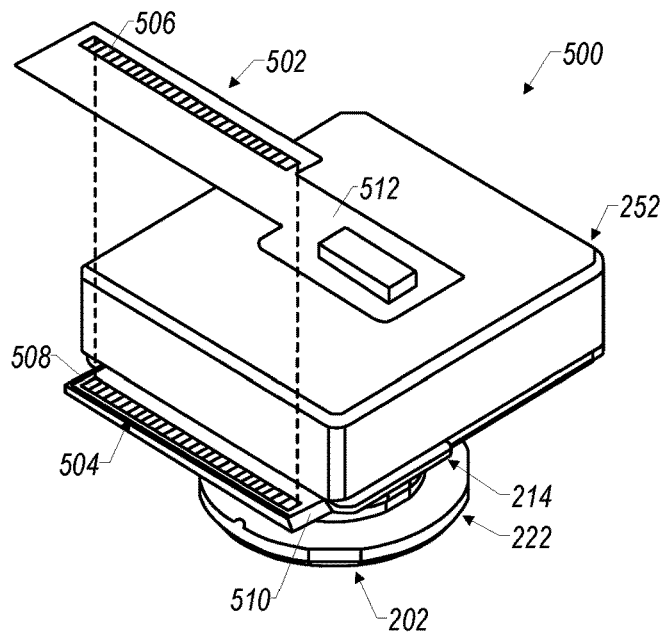
FIG. 5 illustrates a bottom perspective exploded view of another example flex circuit arrangement that may be used to convey electrical signals to, from, and/or within a camera configured with a sensor shift actuator, in accordance with some embodiments.

FIG. 5 shows a bottom perspective exploded view of another example flex circuit arrangement 500 that may be used to convey electrical signals to, from, and/or within a camera (e.g., camera 100 in FIG. 1 and/or camera 200 in FIGS. 2A-2D) configured with a sensor shift actuator. The flex circuit arrangement 500 may include a flex circuit 502 that may electrically interface with a stationary flex circuit 504 that is attached to the base structure 214. For example, as indicated in FIG. 5, the flex circuit 502 may comprise exposed solder tabs 506 that may be attached (e.g., via ACF bonding, reflow soldering, and/or ultrasonic bonding, etc.) with corresponding exposed solder tabs 508 of the stationary flex circuit 504. A portion of the stationary flex circuit 504 comprising the exposed solder tabs 508 may be disposed on a supporting shelf 510 of the base structure 214, e.g., as indicated in FIG. 5.

In some embodiments, the stationary flex circuit 504 may also be coupled with a dynamic flex circuit (e.g., dynamic flex circuit 254 in FIGS. 2A, 2B, and 2D, dynamic flex circuit 302 in FIG. 3, etc.) and/or one or more circuit layers (e.g., flex circuit 220 in FIGS. 2A and 2D, flex circuit 304 in FIG. 3, etc.), e.g., as indicated herein with reference to the coupling of flex circuit 262 and/or flex circuit 306 to a dynamic flex circuit and/or one or more circuit layers. As previously discussed, such a configuration may enable conveying electrical signals between an image sensor package (and/or an image sensor) and the stationary flex circuit 504, via the dynamic flex circuit and/or the one or more circuit layers.

According to various embodiments, the flex circuit 502 may convey electrical signals between the stationary flex circuit 504 and one or more components that are external to the camera, such as an image signal processor (ISP) of a device (e.g., the device 1000 in FIG. 10, the computer system 1100 in FIG. 11, etc.). As indicated in FIG. 5, a portion 512 of the flex circuit 402 may extend away from the camera module so that the flex circuit 502 is configured to convey electrical signals between the camera module and the component(s) that are external to the camera.

Figure 6:
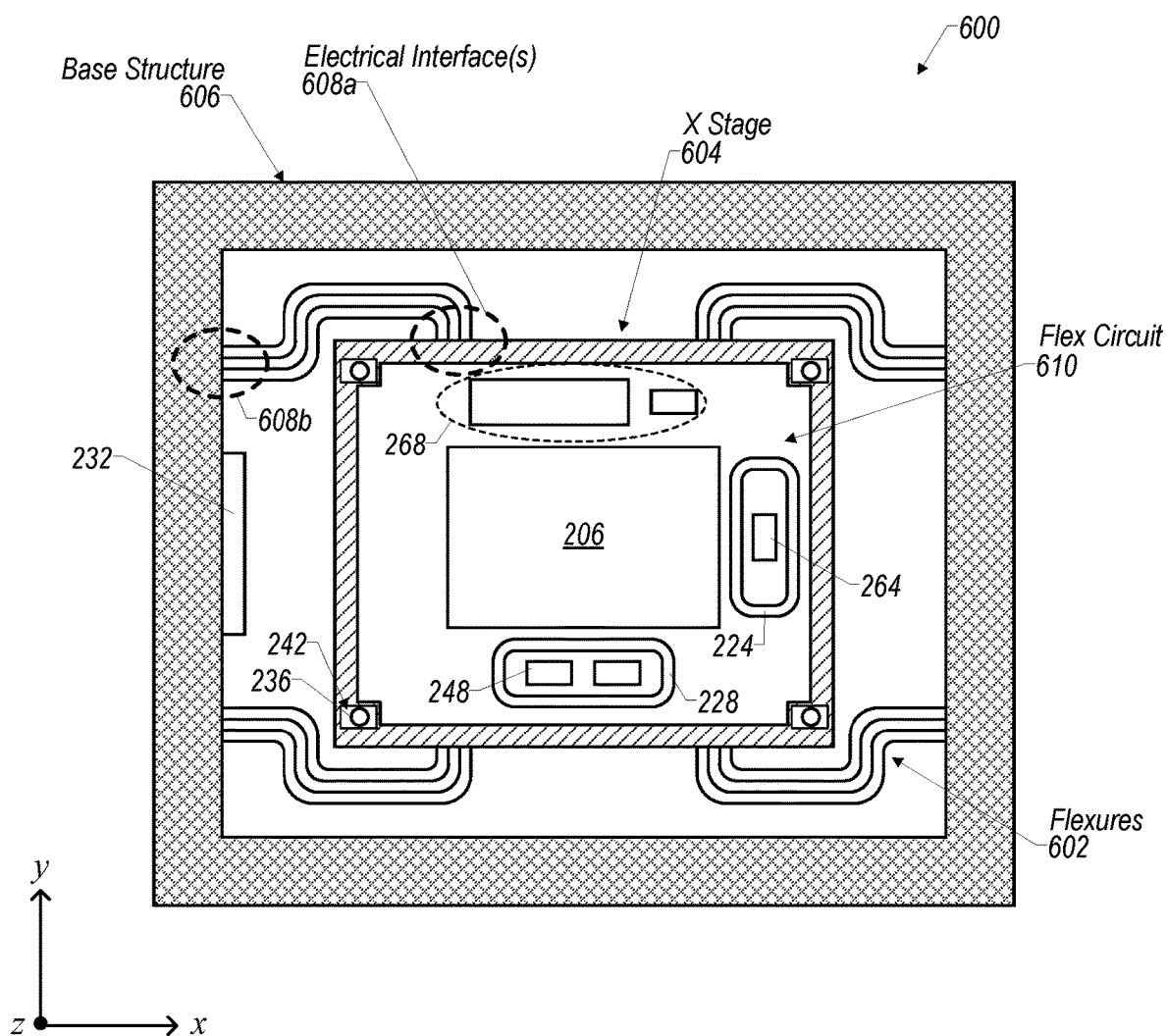
FIG. 6 shows a schematic representation of an example flexure arrangement that may be used to convey electrical signals to, from, and/or within a camera configured with a sensor shift actuator, in accordance with some embodiments.

FIG. 6 shows a schematic representation of an example flexure arrangement 600 that may be used to convey electrical signals to, from, and/or within a camera (e.g., camera 100 in FIG. 1 and/or camera 200 in FIGS. 2A-2D) configured with a sensor shift actuator. The flexure arrangement 600 may include flexures 602 configured to convey electrical signals (e.g., the signals discussed herein with reference to FIGS. 2A-5) between a stage (e.g., X stage 604) of a suspension arrangement and a base structure 606 of the camera. In some embodiments, the flexures 602 may have electrical interfaces 608a with the X stage 604 (and/or one or more components coupled with the X stage 604) and electrical interfaces 608b with the base structure 606 (and/or one or more components coupled with the base structure 606, e.g., as indicated in FIG. 6. According to some embodiments, the flexure(s) 602 and/or the X stage 604 may be in electrical communication with a flex circuit 610 (e.g., flex circuit 220 in FIGS. 2A and 2D, flex circuit 304 in FIG. 3, etc.) and/or an image sensor package (e.g., image sensor package 204 in FIG. 2A) comprising the image sensor 206. Additionally, or alternatively, the flexure(s) 602 may be in electrical communication with a stationary flex circuit (e.g., flex circuit 262 in FIGS. 2A, 2B, 2E, and 2F, stationary flex circuit 306 in FIG. 3, etc.) that is coupled with the base structure 606 and/or the AF coil 232.

Figure 7:
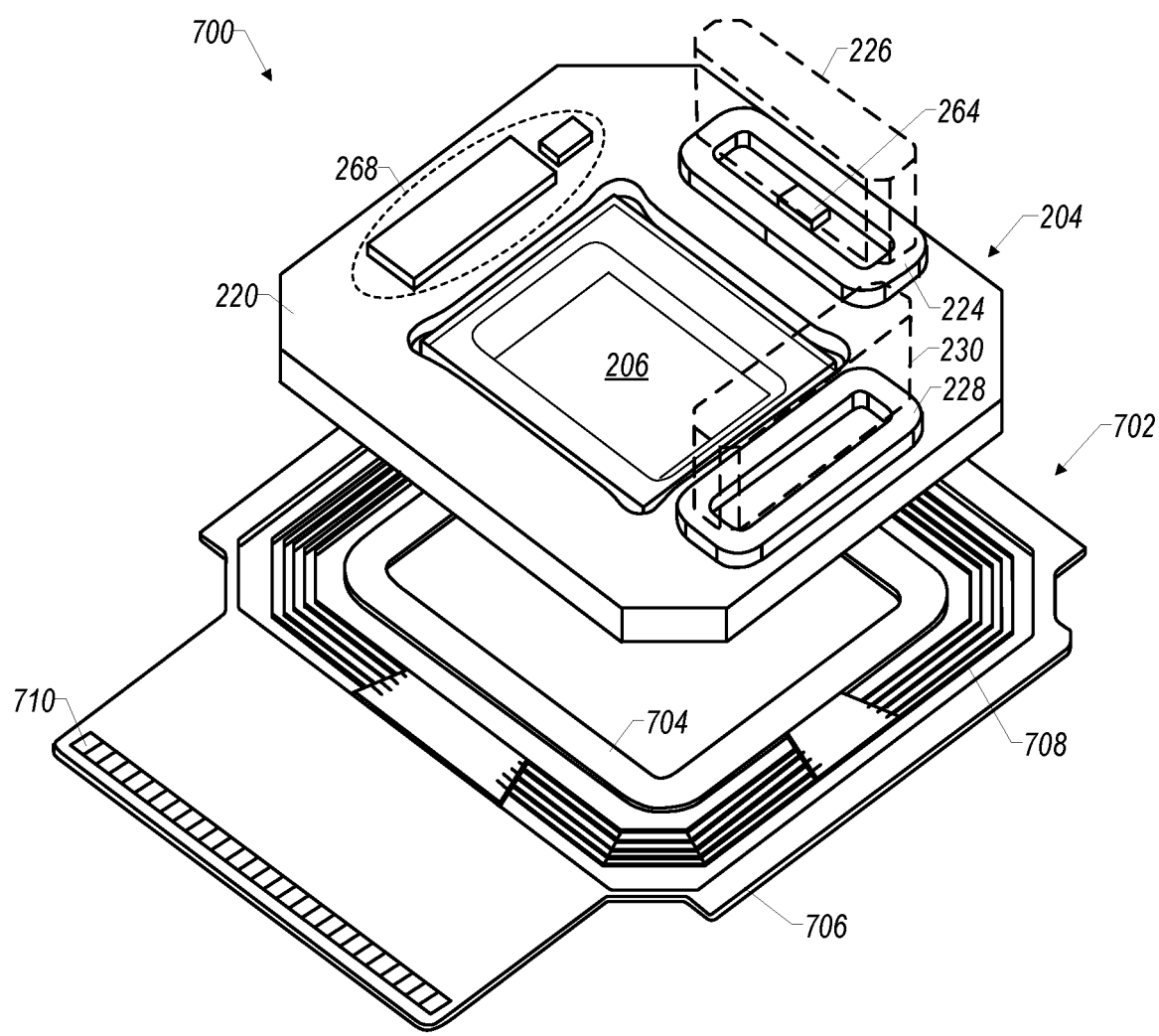
FIG. 7 illustrates a top perspective exploded view of an example flexure suspension arrangement that may be used in a camera having a sensor shift actuator, in accordance with some embodiments.

FIG. 7 shows a top perspective exploded view of an example flexure suspension arrangement 700 that may be used in a camera having a sensor shift actuator e.g., the sensor shift actuator of camera 100 in FIG. 1 and/or the sensor shift actuator of camera 200 in FIGS. 2A-2D). In some embodiments, the flexure suspension arrangement 700 may be used in the camera in addition to, or as an alternative to, at least a portion of the bearing suspension arrangements described herein. For example, the flexure suspension arrangement 700 may be used to suspend the image sensor package 204 (and/or the image sensor 206) from a base structure (e.g., base structure 126 in FIG. 1, base structure 214 in FIGS. 2A-2F, etc.) and/or one or more other stationary structures of the camera. According to some embodiments, the flexure suspension arrangement 700 may allow for controlled X-Y movement of the image sensor, e.g., to provide OIS movement, of an image on the image sensor, in multiple directions. In some embodiments, the flexure suspension arrangement 700 may additionally, or alternatively, allow for controlled movement of the image sensor, relative to the lens group, in a direction parallel to the optical axis (e.g., the Z-axis direction), e.g., to provide AF movement of the image on the image sensor.

In some embodiments, the flexure suspension arrangement 700 may include a frame 702 comprising one or more circuit layers on an inner (dynamic) platform 704 and an outer (stationary) platform 706 that is stationary relative to movement of the inner platform. Furthermore, the flexure suspension arrangement 700 may include flexures 708 that couple the inner platform 704 with the outer platform 706, e.g., as indicated in FIG. 7. The inner platform 704 may be coupled with one or more circuit layers (e.g., flex circuit 220 in FIGS. 2A and 2D, flex circuit 304 in FIG. 3, etc.) of the image sensor package 204, such that electrical signals can be conveyed between the image sensor package 204 (and/or the image sensor 206) and the inner platform 704. The flexures 708 may comprise electrical traces that enable the flexures 708 to convey electrical signals between the inner platform 704 and the outer platform 706. In some embodiments, the frame 702 and/or the outer platform 706 may comprise exposed solder tabs 710 that may be used to electrically connect the flexure suspension arrangement 700 with one or more other flex circuits (e.g., stationary flex circuit 262 attached to the base structure 214), which may be used to convey the electrical signals within the camera and/or between the camera and one or more components that are external to the camera, e.g., as discussed herein with reference to FIGS. 2A-6). Additionally, or alternatively, the exposed solder tabs 710 may be disposed on a portion of the flexure suspension arrangement 700 that exits the camera module and/or extends away from the camera module to one or more components that are exterior to the camera, such that flexure suspension arrangement 700 may be used to convey electrical signals between the image sensor package 204 (and/or the image sensor 206) and the component(s) that are exterior to the camera.

According to various embodiments, the flexures 708 may be configured to be relatively more compliant in directions orthogonal to the optical axis (e.g., the X-Y plane) as compared to a direction parallel to the optical axis (e.g., the Z-axis direction). That is, the flexures 708 may have a higher stiffness in the Z-axis direction relative to their stiffness(es) in the X-Y plane. The compliance of the flexures 708 in the X-Y plane may enable the inner platform 704 to move together with the image sensor package 204 (and/or the image sensor 206) in the X-Y directions in accordance with OIS movement enabled by a sensor shift actuator in some embodiments. The stiffness of the flexures in the Z-axis direction may enable the flexure suspension arrangement 700 to suspend the image sensor package 204 (and/or the image sensor 206) from a stationary structure of the camera and/or restrict movement in the Z-axis direction in some embodiments.

Figure 8:
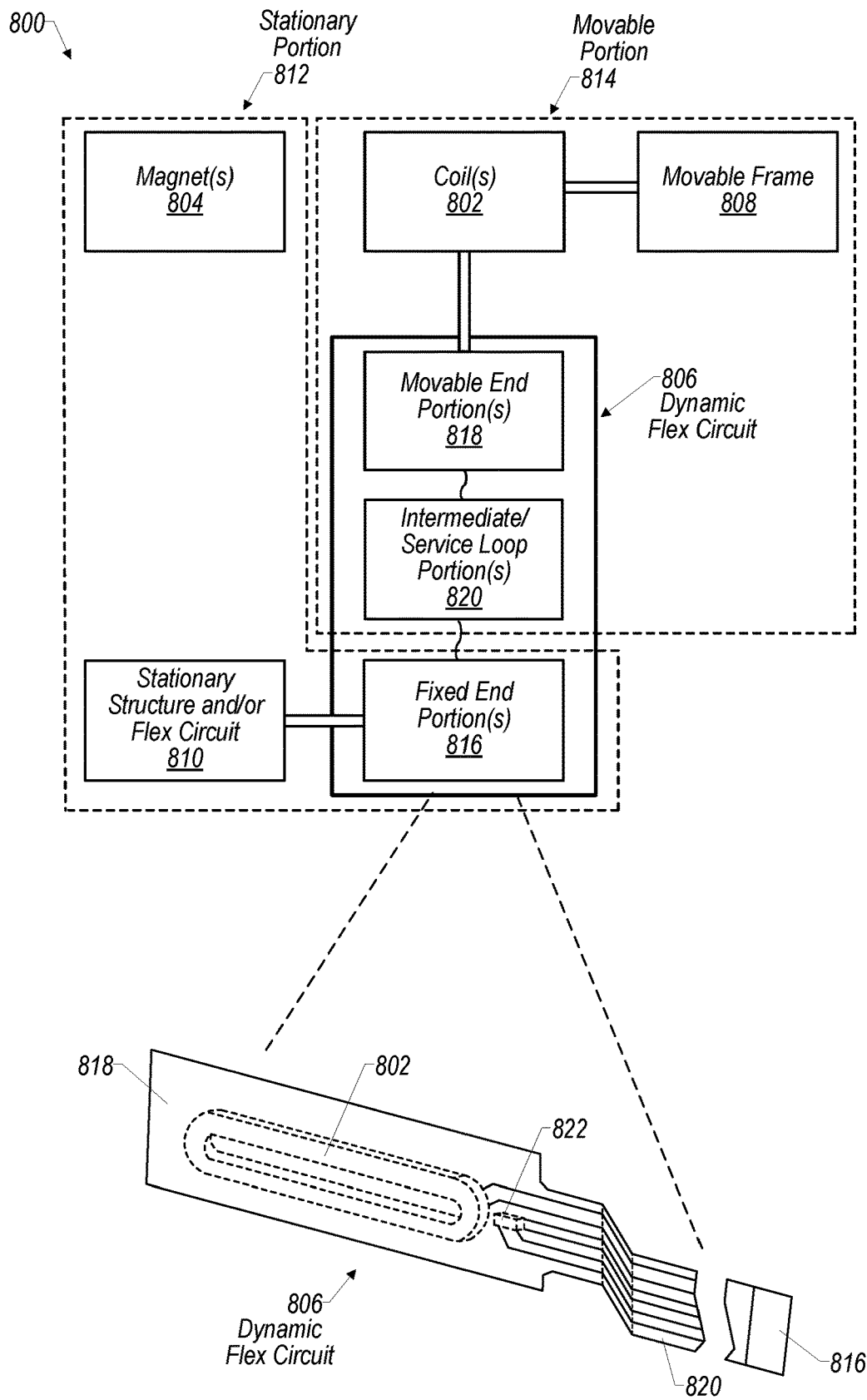
FIG. 8 illustrates a schematic block diagram of some components of an example camera having an actuator with one or more moving coils and a dynamic flex circuit, and a perspective view of an example dynamic flex circuit, in accordance with some embodiments.

FIG. 8 illustrates a schematic block diagram of some components of an example camera 800 having an actuator with one or more moving coils and a dynamic flex circuit, and a perspective view of an example dynamic flex circuit, in accordance with some embodiments. In various embodiments, the camera 800 may include a voice coil motor (VCM) actuator (e.g., comprising one or more coil(s) 802 and one or more magnets 804), a dynamic flex circuit 806, a movable frame 808, and one or more stationary structures (and/or one or more flex circuit(s)) 810. As indicated in FIG. 8, a stationary portion 812 of the camera 800 may include the magnet 804, the stationary structure(s) 810, and a fixed portion of the dynamic flex circuit 806. A movable portion 814 of the camera 800 may include the coil(s) 802, the movable frame 808, and a movable portion of the dynamic flex circuit 806. In various examples, the movable portion 814 of the camera 800 may comprise components that are movable relative to the stationary portion 812 of the camera 800.

According to various embodiments, the movable frame 808 may include a lens carrier (and/or a lens barrel). A lens group (e.g., lens group 102 in FIG. 1) may be fixedly coupled with the lens carrier, such that the lens group is movable (e.g., using the VCM actuator) together with the lens carrier, relative to an image sensor (e.g., image sensor 104 in FIG. 1). In other embodiments, the movable frame 808 may include a stage. An image sensor package including the image sensor may be fixedly coupled with the stage, such that the image sensor package is movable (e.g., using the VCM actuator) together with the stage, relative to the lens group. In some embodiments, the VCM actuator may be used to move the lens group and/or the image sensor in at least one direction parallel to an optical axis defined by the lens group, e.g., to provide autofocus (AF) functionality. Additionally, or alternatively, the VCM actuator may be used to move the lens group and/or the image sensor in one or more directions orthogonal to the optical axis, e.g., to provide optical image stabilization (OIS) functionality.

In some embodiments, the coil(s) 802 may be fixedly coupled with the movable frame 808, such that the coil(s) 802 move together with the movable frame 808. Furthermore, the magnet(s) 804 may be fixedly coupled with the stationary structure(s) 810. Respective sets of one or more coil(s) 802 may be positioned proximate corresponding sets of one or more magnet(s) 804, such that the coil(s) 802 are capable of electromagnetically interacting with the magnet(s) 804 to produce Lorentz forces that move the movable frame 808.

In various embodiments, the dynamic flex circuit 806 may provide an electrical connection between the coil(s) 802 and the stationary structure(s) 810. A portion of the dynamic flex circuit 806 may provide sufficient service loop that allows motion of the movable frame 808 enabled by the VCM actuator. The dynamic flex circuit 806 may be configured to convey electrical signals between the stationary structure(s) 810 and the coil(s) 802 via the electrical connection. According to some embodiments, the dynamic flex circuit 806 may include one or more fixed end portions 816, one or more movable end portions 818, and/or one or more intermediate portions 820. The fixed end portion(s) 816 may be fixedly coupled with the stationary structure(s) 810. The movable end portion(s) 818 may be fixedly coupled with the coil(s) 802. The intermediate portion(s) 820 may extend from the fixed end portion(s) 816 to the movable end portion(s) 818. Furthermore, the intermediate portion(s) 820 may provide the service loop that allows the motion of the movable frame 808 enabled by the VCM actuator. In various embodiments, the intermediate portion(s) 820 may comprise straight region(s), bend region(s), fold(s), and/or leg(s) that enable motion in one or multiple degrees of freedom (DOF). In some non-limiting embodiments, the dynamic flex circuit 806 may enable the movable frame 808 to move in three DOF, e.g., so as to provide AF and OIS functionality.

In some embodiments, the camera 800 may include one or more position sensors 822 for detecting a position of the movable frame 808. The position sensor(s) 822 may be fixedly coupled with the dynamic flex circuit 806. Furthermore, the position sensor(s) 822 may be positioned proximate the coil(s) 802 and/or the magnet(s) 804. For example, the position sensor(s) 822 may be attached to the movable portion 818 of the dynamic flex circuit 806 in some embodiments.

According to some embodiments, the fixed end portion(s) 816 of the dynamic flex circuit 806 may be coupled with one or more other flex circuits, e.g., via electrical interfaces, in a manner similar to that described herein with respect to FIG. 3. For example, the fixed end portion(s) 816 may have an electrical connection with the other flex circuit(s), directly, or indirectly via a conductive path through the stationary structure(s) 810. The other flex circuit(s) may be capable of routing electrical signals between the dynamic flex circuit 806 and at least one of the image sensor package (e.g., when the movable frame 808 is a lens carrier) or one or more external components that are external to the camera 800.

In various embodiments, the movable frame 808 may be suspended from the stationary structure(s) 810, e.g., via one or more of the suspension arrangements described herein.

Figure 9:
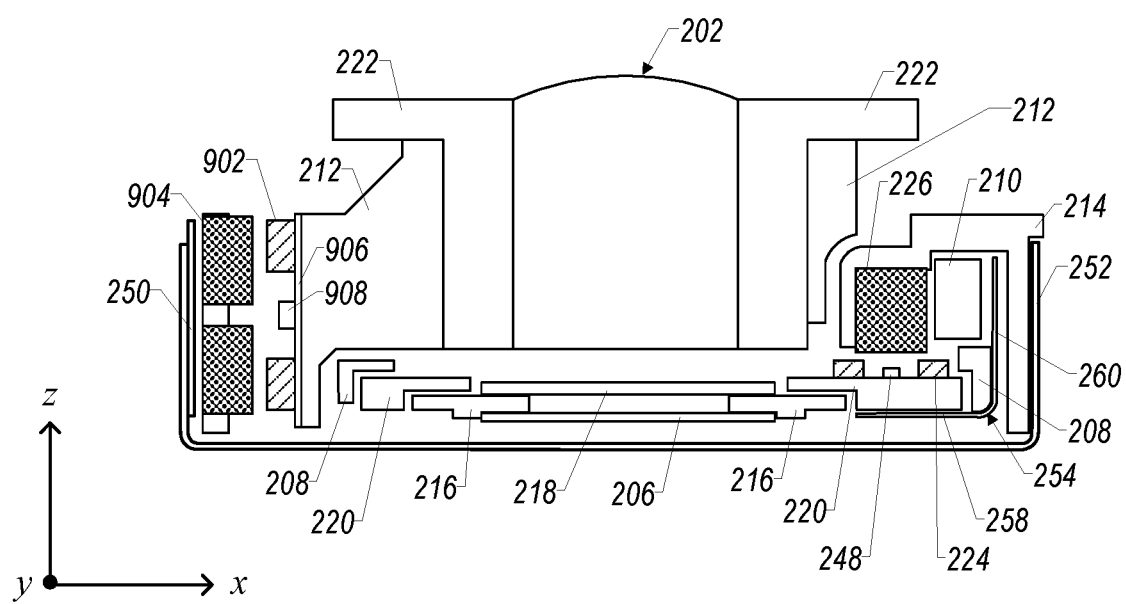
FIG. 9 illustrates a side cross-sectional view of an example camera that may include an actuator with one or more moving coils and a dynamic flex circuit, in accordance with some embodiments.

FIG. 9 illustrates a side cross-sectional view of an example camera 900 that may include an actuator with moving coils (e.g., coil(s) 802 in FIG. 8) and a dynamic flex circuit (e.g., dynamic flex circuit 806 in FIG. 8). Unless otherwise specified herein, the components in FIG. 9 labeled with reference numerals from FIG. 2D may be the same as those described with reference to FIGS. 2A-2D.

In some embodiments, a VCM actuator of the camera 900 may include the coil(s) 902 and one or more magnets 904 (e.g., magnet(s) 804 in FIG. 8). The coil(s) 902 may be fixedly coupled with a movable frame (e.g., lens carrier 212) and with a dynamic flex circuit 906. For example, the coil(s) 902 may be attached to and/or at least partially embedded within a movable end portion (e.g., movable end portion 818 in FIG. 8) of the dynamic flex circuit 906. The magnet(s) 904 may be attached to one or more stationary structures (e.g., stationary structure(s) 810 in FIG. 8), such as the base structure 214. In various embodiments, a fixed end portion (e.g., fixed end portion 816 in FIG. 8) may be coupled with the stationary structure(s) and/or one or more other flex circuits as described herein. In some examples, the dynamic flex circuit 906 may have an electrical interface with the dynamic flex circuit 254 that is coupled with the image sensor 206.

In some embodiments, the camera 900 may include a position sensor 908 (e.g., position sensor 822 in FIG. 8) that is fixedly coupled with the dynamic flex circuit 906. For instance, the position sensor 908 may be attached to the movable end portion of the dynamic flex circuit 906. The position sensor 908 may be used to detect magnetic field changes, e.g., as the position sensor 908 moves (together with the coil(s) 902 and the lens group 202) in the Z-axis direction relative to the magnet(s) 904. In some non-limiting examples, the position sensor 908 may be encircled by the coil 902.

FIG. 10 illustrates a schematic representation of an example device 1000 that may include a camera (e.g., camera 100 in FIG. 1, camera 200 in FIGS. 2A-2D, etc.) having a sensor shift actuator and/or a bearing suspension arrangement, in accordance with some embodiments. In some embodiments, the device 1000 may be a mobile device and/or a multifunction device. In various embodiments, the device 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1000 may include a display system 1002 (e.g., comprising a display and/or a touch-sensitive surface) and/or one or more cameras 1004. In some non-limiting embodiments, the display system 1002 and/or one or more front-facing cameras 1004a may be provided at a front side of the device 1000, e.g., as indicated in FIG. 10. Additionally, or alternatively, one or more rear-facing cameras 1004b may be provided at a rear side of the device 1000. In some embodiments comprising multiple cameras 1004, some or all of the cameras may be the same as, or similar to, each other. Additionally, or alternatively, some or all of the cameras may be different from each other. In various embodiments, the location(s) and/or arrangement(s) of the camera(s) 1004 may be different than those indicated in FIG. 10.

Among other things, the device 1000 may include memory 1006 (e.g., comprising an operating system 1008 and/or application(s)/program instructions 1010), one or more processors and/or controllers 1012 (e.g., comprising CPU(s), memory controller(s), display controller(s), and/or camera controller(s), etc.), and/or one or more sensors 1016 (e.g., orientation sensor(s), proximity sensor(s), and/or position sensor(s), etc.). In some embodiments, the device 1000 may communicate with one or more other devices and/or services, such as computing device(s) 1018, cloud service(s) 1020, etc., via one or more networks 1022. For example, the device 1000 may include a network interface (e.g., network interface 1110 in FIG. 11) that enables the device 1000 to transmit data to, and receive data from, the network(s) 1022. Additionally, or alternatively, the device 1000 may be capable of communicating with other devices via wireless communication using any of a variety of communications standards, protocols, and/or technologies.

FIG. 11 illustrates a schematic block diagram of an example computing device, referred to as computer system 1100, that may include or host embodiments of a camera having a sensor shift actuator and/or a suspension arrangement, e.g., as described herein with reference to FIGS. 1-10. In addition, computer system 1100 may implement methods for controlling operations of the camera and/or for performing image processing images captured with the camera. In some embodiments, the device 1000 (described herein with reference to FIG. 10) may additionally, or alternatively, include some or all of the functional components of the computer system 1100 described herein.

The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1100 includes one or more processors 1102 coupled to a system memory 1104 via an input/output (I/O) interface 1106. Computer system 1100 further includes one or more cameras 1108 coupled to the I/O interface 1106. Computer system 1100 further includes a network interface 1110 coupled to I/O interface 1106, and one or more input/output devices 1112, such as cursor control device 1114, keyboard 1116, and display(s) 1118. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1102, or a multiprocessor system including several processors 1102 (e.g., two, four, eight, or another suitable number). Processors 1102 may be any suitable processor capable of executing instructions. For example, in various embodiments processors 1102 may be general-purpose or embedded processors implementing any of a variety of instruction set architectures (ISAs), such as the x86, PowerPC, SPARC, or MIPS ISAs, or any other suitable ISA. In multiprocessor systems, each of processors 1102 may commonly, but not necessarily, implement the same ISA.

System memory 1104 may be configured to store program instructions 1120 accessible by processor 1102. In various embodiments, system memory 1104 may be implemented using any suitable memory technology, such as static random access memory (SRAM), synchronous dynamic RAM (SDRAM), nonvolatile/Flash-type memory, or any other type of memory. Additionally, existing camera control data 1122 of memory 1104 may include any of the information or data structures described above. In some embodiments, program instructions 1120 and/or data 1122 may be received, sent or stored upon different types of computer-accessible media or on similar media separate from system memory 1104 or computer system 1100. In various embodiments, some or all of the functionality described herein may be implemented via such a computer system 1100.

In one embodiment, I/O interface 1106 may be configured to coordinate I/O traffic between processor 1102, system memory 1104, and any peripheral devices in the device, including network interface 1110 or other peripheral interfaces, such as input/output devices 1112. In some embodiments, I/O interface 1106 may perform any necessary protocol, timing or other data transformations to convert data signals from one component (e.g., system memory 1104) into a format suitable for use by another component (e.g., processor 1102). In some embodiments, I/O interface 1106 may include support for devices attached through various types of peripheral buses, such as a variant of the Peripheral Component Interconnect (PCI) bus standard or the Universal Serial Bus (USB) standard, for example. In some embodiments, the function of I/O interface 1106 may be split into two or more separate components, such as a north bridge and a south bridge, for example. Also, in some embodiments some or all of the functionality of I/O interface 1106, such as an interface to system memory 1104, may be incorporated directly into processor 1102.

Network interface 1110 may be configured to allow data to be exchanged between computer system 1100 and other devices attached to a network 1124 (e.g., carrier or agent devices) or between nodes of computer system 1100. Network 1124 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1110 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1112 may, in some embodiments, include one or more display terminals, keyboards, keypads, touchpads, scanning devices, voice or optical recognition devices, or any other devices suitable for entering or accessing data by one or more computer systems 1100. Multiple input/output devices 1112 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1110.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group comprising one or more lens elements;
   an image sensor to capture image data based on light that has passed through the lens group;
   a movable frame fixedly coupled with the lens group or the image sensor;
   one or more stationary structures;
   a voice coil motor (VCM) actuator to move the movable frame relative to the one or more stationary structures, comprising:
      a coil fixedly coupled with the movable frame, such that the coil moves together with the movable frame; and
      a magnet fixedly coupled with the one or more stationary structures; and
   a flex circuit that provides an electrical connection between the coil and the one or more stationary structures, wherein a portion of the flex circuit provides a service loop including one or more discrete folds that allows motion of the movable frame enabled by the VCM actuator, wherein a moveable end portion of the flex circuit is fixedly coupled with the coil and the moveable frame, and wherein the flex circuit conveys electrical signals between the one or more stationary structures and the coil via the electrical connection.

2. The camera of claim 1, wherein the flex circuit comprises:
   a fixed end portion fixedly coupled with the one or more stationary structures;
   an intermediate portion that extends from the fixed end portion to the movable end portion and that provides the service loop.

3. The camera of claim 1, wherein the movable frame comprises a lens carrier fixedly coupled with the lens group.

4. The camera of claim 3, wherein:
   the flex circuit is a first flex circuit;
   the one or more stationary structures comprise at least one of:
      a base structure; or
      a stationary portion of a second flex circuit that is attached to the base structure, wherein the second flex circuit is capable of routing electrical signals between the first flex circuit and at least one of:
         an image sensor package that includes the image sensor; or
         one or more external components that are external to the camera.

5. The camera of claim 3, wherein:
   the one or more stationary structures comprise a base structure; and
   the camera further comprises:
      a bearing suspension arrangement to suspend the lens carrier from the base structure, wherein the lens carrier is configured to move on ball bearings so as to allow motion enabled by the VCM actuator.

6. The camera of claim 1, wherein:
the movable frame comprises a stage that is fixedly coupled with the image sensor;
the one or more stationary structures comprise a base structure; and
the camera further comprises:
a bearing suspension arrangement to suspend the stage from the base structure, wherein the stage is configured to move on ball bearings so as to allow motion enabled by the VCM actuator.

7. The camera of claim 1, further comprising:
a position sensor for detecting a position of the movable frame, wherein the position sensor is fixedly coupled with the flex circuit and positioned proximate the coil.

8. A device, comprising:
one or more processors;
memory storing program instructions executable by the one or more processors to control operation of a camera; and
the camera, comprising:
a lens group comprising one or more lens elements;
an image sensor to capture image data based on light that has passed through the lens group;
a movable frame fixedly coupled with the lens group or the image sensor;
one or more stationary structures;
a voice coil motor (VCM) actuator to move the movable frame relative to the one or more stationary structures, the VCM actuator comprising:
a coil fixedly coupled with the movable frame, such that the coil moves together with the movable frame; and
a magnet fixedly coupled with the one or more stationary structures; and
a flex circuit that provides an electrical connection between the coil and the one or more stationary structures, wherein a portion of the flex circuit provides a service loop including one or more discrete folds that allows motion of the movable frame enabled by the VCM actuator, wherein a moveable end portion of the flex circuit is fixedly coupled with the coil and the moveable frame, and wherein the flex circuit conveys electrical signals between the one or more stationary structures and the coil via the electrical connection.

9. The device of claim 8, wherein the flex circuit comprises:
a fixed end portion fixedly coupled with the one or more stationary structures; and
an intermediate portion that extends from the fixed end portion to the movable end portion and that provides the service loop.

10. The device of claim 8, wherein the movable frame comprises a lens carrier fixedly coupled with the lens group.

11. The device of claim 10, wherein:
the flex circuit is a first flex circuit;
the one or more stationary structures comprise at least one of:
a base structure; or
a stationary portion of a second flex circuit that is attached to the base structure, wherein the second flex circuit is capable of routing electrical signals between the first flex circuit and at least one of:
an image sensor package that includes the image sensor; or
one or more external components that are external to the camera.

12. The device of claim 10, wherein:
the one or more stationary structures comprise a base structure; and
the camera further comprises:
a bearing suspension arrangement to suspend the lens carrier from the base structure, wherein the lens carrier is configured to move on ball bearings so as to allow motion enabled by the VCM actuator.

13. The device of claim 8, wherein:
the movable frame comprises a stage that is fixedly coupled with the image sensor;
the one or more stationary structures comprise a base structure; and
the camera further comprises:
a bearing suspension arrangement to suspend the stage from the base structure, wherein the stage is configured to move on ball bearings so as to allow motion enabled by the VCM actuator.

14. The device of claim 8, wherein the camera further comprises:
a position sensor for detecting a position of the movable frame, wherein the position sensor is fixedly coupled with the flex circuit and positioned proximate the coil.

15. The device of claim 8, wherein the one or more processors are configured to cause the VCM actuator to move the lens group in at least one direction parallel to an optical axis defined by the one or more lens elements.

16. A flex circuit for a camera, the flex circuit comprising:
a fixed end portion to couple with one or more stationary structures of the camera;
a movable end portion to fixedly couple with a movable coil of a voice coil motor (VCM) actuator of the camera, wherein the movable coil is to electromagnetically interact with a stationary magnet of the VCM actuator, so as to produce Lorentz forces that move a movable frame of the camera, together with the movable coil, relative to the one or more stationary structures; and
an intermediate portion to convey electrical signals between the fixed end portion and the movable end portion, wherein the intermediate portion provides a service loop including one or more discrete folds that allows motion of the movable frame enabled by the VCM actuator.

17. The flex circuit of claim 16, wherein the movable end portion is coupled with the movable coil such that the electrical signals are capable of supplying a drive current to the movable coil.

18. The flex circuit of claim 16, wherein:
the movable frame is a lens carrier to which a lens group comprising one or more lens elements of the camera is attached; and
the intermediate portion is to allow the movable end portion to move together with the lens group.

19. The flex circuit of claim 16, wherein:
the movable frame is a stage to which an image sensor package comprising an image sensor is attached; and
the intermediate portion is to allow the movable end portion to move together with the image sensor.

20. The flex circuit of claim 16, wherein the intermediate portion comprises one or more bend regions:
the movable frame is a stage to which an image sensor package comprising an image sensor is attached; and
the intermediate portion is to allow the movable end portion to move together with the image sensor.

* * * * *